(12) United States Patent
Haggerty et al.

(10) Patent No.: US 8,887,257 B2
(45) Date of Patent: Nov. 11, 2014

(54) ELECTRONIC ACCESS CLIENT DISTRIBUTION APPARATUS AND METHODS

(76) Inventors: David T. Haggerty, Cupertino, CA (US); Kevin McLaughlin, Mountain View, CA (US); Jerrold Von Hauck, Windermere, FL (US); Arun Mathias, Cupertino, CA (US)

(*) Notice: Subject to any disclaimer, the term of this patent is extended or adjusted under 35 U.S.C. 154(b) by 0 days.

(21) Appl. No.: 13/457,333

(22) Filed: Apr. 26, 2012

(65) Prior Publication Data
US 2012/0331292 A1 Dec. 27, 2012

Related U.S. Application Data

(60) Provisional application No. 61/479,319, filed on Apr. 26, 2011.

(51) Int. Cl.
| H04L 29/06 | (2006.01) |
| H04W 12/12 | (2009.01) |
| H04W 4/02 | (2009.01) |
| H04W 4/00 | (2009.01) |

(52) U.S. Cl.
CPC ............ *H04L 63/0853* (2013.01); *H04L 63/08* (2013.01); *H04W 12/12* (2013.01); *H04L 63/0272* (2013.01); *H04W 4/028* (2013.01); *H04W 4/003* (2013.01)
USPC .............................................................. 726/9

(58) Field of Classification Search
CPC .................................................. H04L 63/0853
USPC .............................................. 713/168; 726/9
See application file for complete search history.

(56) References Cited

U.S. PATENT DOCUMENTS 6,372,974 B1 4/2002 Gross et al.
7,313,381 B1 * 12/2007 Lemilainen et al. .......... 455/405

(Continued)

FOREIGN PATENT DOCUMENTS

EP 2448215 A1 5/2012
EP 2448216 A1 5/2012

(Continued)

OTHER PUBLICATIONS

Pesonen et al.; Encryption-enforced access control in dynamic multi-domain publish/subscribe networks; Published in: Proceeding DEBS '07 Proceedings of the 2007 inaugural international conference on Distributed event-based systems; 2007; pp. 104-115; ACM Digital Library.*

(Continued)

*Primary Examiner* — Bradley Holder
(74) *Attorney, Agent, or Firm* — Womble Carlyle Sandridge & Rice, LLP

(57) ABSTRACT

Apparatus and methods for distributing access control clients. In one exemplary embodiment, a network infrastructure is disclosed that enables delivery of electronic subscriber identity modules (eSIMs) to secure elements (e.g., electronic Universal Integrated Circuit Cards (eUICCs), etc.) The network architecture includes one or more of: (i) eSIM appliances, (ii) secure eSIM storages, (iii) eSIM managers, (iv) eUICC appliances, (v) eUICC managers, (vi) service provider consoles, (vii) account managers, (viii) Mobile Network Operator (MNO) systems, (ix) eUICCs that are local to one or more devices, and (x) depots. Moreover, each depot may include: (xi) eSIM inventory managers, (xii) system directory services, (xiii) communications managers, and/or (xiv) pending eSIM storages. Functions of the disclosed infrastructure can be flexibly partitioned and/or adapted such that individual parties can host portions of the infrastructure. Exemplary embodiments of the present invention can provide redundancy, thus ensuring maximal uptime for the overall network (or the portion thereof).

18 Claims, 8 Drawing Sheets

(56) References Cited

U.S. PATENT DOCUMENTS

| | | | |
|---|---|---|---|
| 8,364,964 B2 * | 1/2013 | Medvinsky et al. | 713/171 |
| 2002/0147926 A1 * | 10/2002 | Pecen et al. | 713/201 |
| 2005/0020308 A1 * | 1/2005 | Lai | 455/558 |
| 2005/0114680 A1 * | 5/2005 | Chinnaswamy et al. | 713/185 |
| 2005/0153725 A1 * | 7/2005 | Naghian et al. | 455/520 |
| 2005/0266883 A1 * | 12/2005 | Chatrath | 455/558 |
| 2006/0052085 A1 * | 3/2006 | Gregrio Rodriguez et al. | 455/411 |
| 2006/0115057 A1 * | 6/2006 | Laliberte | 379/37 |
| 2007/0149170 A1 * | 6/2007 | Bloebaum et al. | 455/411 |
| 2008/0104706 A1 | 5/2008 | Karp et al. | |
| 2008/0148414 A1 | 6/2008 | Tom | |
| 2008/0260149 A1 | 10/2008 | Gehrmann | |
| 2008/0270307 A1 | 10/2008 | Olson et al. | |
| 2009/0068988 A1 * | 3/2009 | Cofta | 455/411 |
| 2009/0077643 A1 | 3/2009 | Schmidt et al. | |
| 2009/0205028 A1 | 8/2009 | Smeets et al. | |
| 2009/0239503 A1 | 9/2009 | Smeets | |
| 2010/0311468 A1 | 12/2010 | Shi et al. | |
| 2011/0003580 A1 * | 1/2011 | Belrose et al. | 455/410 |
| 2011/0217995 A1 * | 9/2011 | Jimenez Aldama et al. | 455/466 |
| 2012/0040641 A1 * | 2/2012 | Bennett | 455/411 |
| 2012/0072979 A1 * | 3/2012 | Cha et al. | 726/7 |
| 2012/0108295 A1 * | 5/2012 | Schell et al. | 455/558 |
| 2012/0115542 A1 * | 5/2012 | Griffin et al. | 455/552.1 |
| 2012/0208597 A1 * | 8/2012 | Billman | 455/558 |
| 2013/0017862 A1 * | 1/2013 | Lee et al. | 455/558 |
| 2014/0094208 A1 * | 4/2014 | Egner et al. | 455/513 |

FOREIGN PATENT DOCUMENTS

| | | |
|---|---|---|
| EP | 2509342 A2 | 10/2012 |
| EP | 2509352 A2 | 10/2012 |
| WO | 03079628 A1 | 9/2003 |

OTHER PUBLICATIONS

Tsai et al.; SIM-based subscriber authentication for wireless local area networks; Published in: Security Technology, 2003. Proceedings. IEEE 37th Annual 2003 International Carnahan Conference on Date of Conference: Oct. 14-16, 2003 pp. 468-473; IEEE Xplore.*

Oma; Open Mobile Alliance: "OMA DRM Specification Candidate Version 2.2", Apr. 19, 2011, XP55041315, Retrieved from the Internet: URL:http://www.openmobilealliance.org/Technical/release_program/docs/DRM/V2_2-20110419-C/OMA-TS-DRM_DRM-V2_2-20110419-C.pdf.

"3rd Generation Partnership Project; Technical Specification Group Services and System Aspects; Feasibility study on the security aspects of remote provisioning and change of subscription for Machine to Machine (M2M) equipment (Release 9)", 3GPP Standard; 3GPP TR 33.812, 3rd Generation Partnership Project (3GPP), Mobile Competence Centre; 650, Route Des Lucioles; F-06921 Sophia-Antipolis Cedex; France; No. V9.2.0, Jun. 22, 2010, pp. 1-87, XP050441986, [retrieved on Jun. 22, 2010].

* cited by examiner

ELECTRONIC ACCESS CLIENT DISTRIBUTION APPARATUS AND METHODS

PRIORITY AND RELATED APPLICATIONS

This application claims priority to U.S. Provisional Patent Application No. 61/479,319 filed Apr. 26, 2011 and entitled "ELECTRONIC ACCESS CLIENT DISTRIBUTION APPARATUS AND METHODS", the foregoing being incorporated herein by reference in its entirety.

This application is related to co-owned U.S. patent application Ser. No. 13/080,558 filed on Apr. 5, 2011, and entitled "APPARATUS AND METHODS FOR CONTROLLING DISTRIBUTION OF ELECTRONIC ACCESS CLIENTS", Ser. No. 12/952,082 filed on Nov. 22, 2010 and entitled "WIRELESS NETWORK AUTHENTICATION APPARATUS AND METHODS", Ser. No. 12/952,089 filed on Nov. 22, 2010 and entitled "APPARATUS AND METHODS FOR PROVISIONING SUBSCRIBER IDENTITY DATA IN A WIRELESS NETWORK", Ser. No. 12/980,232 filed on Dec. 28, 2010 and entitled "VIRTUAL SUBSCRIBER IDENTITY MODULE DISTRIBUTION SYSTEM", and Ser. No. 12/353,227 filed on Jan. 13, 2009, and entitled "POSTPONED CARRIER CONFIGURATION", and U.S. Provisional Patent Application Ser. Nos. 61/472,109 filed Apr. 5, 2011 and entitled "APPARATUS AND METHODS FOR STORING ELECTRONIC ACCESS CLIENTS" (now U.S. patent application Ser. No. 13/093,722 filed on Apr. 25, 2011, of the same title"), 61/472,115 filed on Apr. 5, 2011, and entitled "APPARATUS AND METHODS FOR DISTRIBUTING AND STORING ELECTRONIC ACCESS CLIENTS" (now U.S. patent application Ser. No. 13/095,716 filed on Apr. 27, 2011, of the same title"), 61/407,858 filed on Oct. 28, 2010 and entitled "METHODS AND APPARATUS FOR ACCESS CONTROL CLIENT ASSISTED ROAMING" (now U.S. patent application Ser. No. 13/109,851 filed on May 17, 2011, of the same title"), 61/407,861 filed on Oct. 28, 2010 and entitled "MANAGEMENT SYSTEMS FOR MULTIPLE ACCESS CONTROL ENTITIES" (now U.S. patent application Ser. No. 13/079,614 filed on Apr. 4, 2011, of the same title"), 61/407,862 filed on Oct. 28, 2010 and entitled "METHODS AND APPARATUS FOR DELIVERING ELECTRONIC IDENTIFICATION COMPONENTS OVER A WIRELESS NETWORK" (now U.S. patent application Ser. No. 13/111,801 filed on May 19, 2011, of the same title"), 61/407,866 filed on Oct. 28, 2010 and entitled "METHODS AND APPARATUS FOR STORAGE AND EXECUTION OF ACCESS CONTROL CLIENTS" (now U.S. patent application Ser. No. 13/080,521 filed on Apr. 5, 2011, of the same title), 61/408,504 filed on Oct. 29, 2010 and entitled "ACCESS DATA PROVISIONING SERVICE" (now U.S. patent application Ser. No. 13/078,811 filed on Apr. 1, 2011, and entitled "ACCESS DATA PROVISIONING APPARATUS AND METHODS"), 61/409,891 filed on Nov. 3, 2010 and entitled "METHODS AND APPARATUS FOR ACCESS DATA RECOVERY FROM A MALFUNCTIONING DEVICE" (now U.S. patent application Ser. No. 13/287, 874 filed on Nov. 2, 2011, of the same title"), 61/410,298 filed on Nov. 4, 2010 and entitled "SIMULACRUM OF PHYSICAL SECURITY DEVICE AND METHODS" (now U.S. patent application Ser. No. 13/080,533 filed on Apr. 5, 2011, of the same title), and 61/413,317 filed on Nov. 12, 2010 and entitled "APPARATUS AND METHODS FOR RECORDATION OF DEVICE HISTORY ACROSS MULTIPLE SOFTWARE EMULATION" (now U.S. patent application Ser. No. 13/294,631 filed on Nov. 11, 2011, of the same title"), each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of communications systems, and more particularly in one exemplary aspect to distributing access control clients to devices.

2. Description of Related Technology

Access control is required for secure communication in most prior art wireless radio communication systems. As an example, one simple access control scheme might comprise: (i) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) executing on a physical Universal Integrated Circuit Card (UICC). The USIM access control client authenticates the subscriber to the UMTS cellular network. After successful authentication, the subscriber is allowed access to the cellular network. As used hereinafter, the term "access control client" refers generally to a logical entity, either embodied within hardware or software, suited for controlling access of a first device to a network. Common examples of access control clients include the aforementioned USIM, CDMA Subscriber Identification Modules (CSIM), IP Multimedia Services Identity Module (ISIM), Subscriber Identity Modules (SIM), Removable User Identity Modules (RUIM), etc.

Traditionally, the USIM (or more generally "SIM") performs the well known Authentication and Key Agreement (AKA) procedure, which verifies and decrypts the applicable data and programs to ensure secure initialization. Specifically, the USIM must both (i) successfully answer a remote challenge to prove its identity to the network operator, and (ii) issue a challenge to verify the identity of the network.

While traditional SIM solutions are embodied within a removable Integrated Circuit Card (ICC) (also referred to as a "SIM card"), incipient research by the Assignee hereof is directed to virtualizing SIM operation within a software client executing within the mobile device. Virtualized SIM operation can reduce device size, increase device functionality, and provide greater flexibility.

Unfortunately, virtualized SIM operation also presents multiple new challenges for, inter alia, network operators and device manufacturers.

SUMMARY OF THE INVENTION

The present invention addresses the foregoing needs by providing, inter alia, apparatus and methods for efficiently distributing access control clients within a network.

In one aspect of the present invention, a network for distributing access control clients is disclosed. In one embodiment, the network includes: one or more electronic Subscriber Identity Module (eSIM) appliances, one or more secure eSIM storages configured to store the one or more eSIMs and associated eSIM metadata, the one or more secure eSIM storages coupled to the one or more eSIM appliances; one or more eSIM managers, wherein each of the eSIM managers is configured to track, verify, and authorize the one or more eSIMs; one or more eUICC appliances, wherein each of the eUICC appliances is configured to protect one or more cryptographic materials transmitted to one or more device eUICCs; one or more eUICC managers, wherein each of the eUICC managers is configured to track, verify, and authorize the one or more device eUICCs; and one or more depots, each depot comprising: an eSIM inventory manager configured to distribute network traffic among the one or more eSIM managers; a system directory service configured to distribute address information for at one or more eSIM managers; and a pending eSIM storage configured to store eSIMs for delivery to the one or more device eUICCs.

In a second aspect of the present invention, a method for distributing access control clients is disclosed. In one exemplary embodiment, the method includes: protecting the contents of one or more access control clients according to a first standard trusted relationship; controlling a number of copies of the access control client according to a second standard trusted relationship; and distributing the access control client to users for use according to a third trusted relationship.

Further features of the present invention, its nature and various advantages will be more apparent from the accompanying drawings and the following detailed description.

Figure 1:
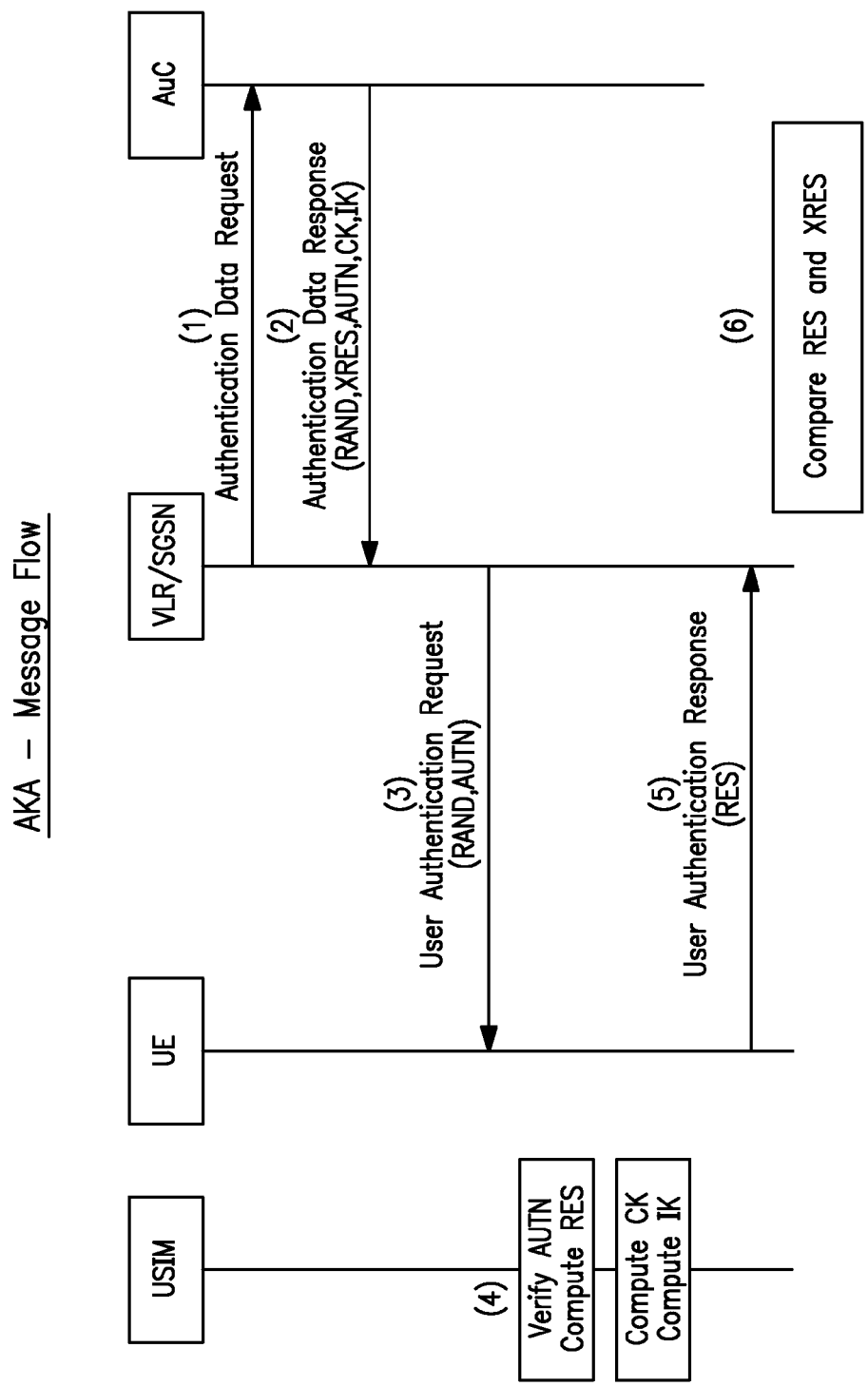
FIG. 1 graphically illustrates one exemplary Authentication and Key Agreement (AKA) procedure using a prior art USIM.

All Figures © Copyright 2012 Apple Inc. All rights reserved

DETAILED DESCRIPTION OF THE INVENTION

Reference is now made to the drawings wherein like numbers refer to like parts throughout.

Overview

The present invention provides, inter alia, methods and apparatus for enabling secure electronic delivery of access control clients and associated network operator and user data to deployed devices. In one exemplary embodiment, a network infrastructure is disclosed that enables delivery of electronic subscriber identity modules (eSIMs) to secure elements (e.g., electronic Universal Integrated Circuit Cards (eUICCs), eUICC appliances, etc.) The network infrastructure enables management and movement of an inventory of eSIMs.

Moreover, various functions of the disclosed infrastructure can be flexibly partitioned and/or adapted such that individual parties (e.g., device manufacturers, network carriers, third party resalers, customers, etc.) can host portions of the infrastructure; such piecemeal solutions can advantageously be optimized for each individual party's needs.

Still further, exemplary embodiments of the present invention can provide redundancy, thus ensuring maximal uptime for the overall network (or the portion thereof).

Exemplary methods of operation, apparatus, and use scenarios are described in greater detail herein.

DETAILED DESCRIPTION OF EXEMPLARY EMBODIMENTS

Exemplary embodiments and aspects of the present invention are now described in detail. While these embodiments and aspects are primarily discussed in the context of Subscriber Identity Modules (SIMs) of a GSM, GPRS/EDGE, or UMTS cellular network, it will be recognized by those of ordinary skill that the present invention is not so limited. In fact, the various aspects of the invention are useful in any network (whether wireless cellular or otherwise) that can benefit from storing and distributing access control clients to devices.

It will also be recognized that while the term "subscriber identity module" is used herein (e.g., eSIM), this term in no way necessarily connotes or requires either (i) use by a subscriber per se (i.e., the invention may be practiced by a subscriber or non-subscriber); (ii) identity of a single individual (i.e., the invention may be practiced on behalf of a group of individuals such as a family, or intangible or fictitious entity such as an enterprise); or (iii) any tangible "module" equipment or hardware.

Prior Art Subscriber Identity Module (SIM) Operation—

Within the context of the exemplary prior art UMTS cellular network, user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services. The USIM software is based on the Java Card™ programming language. Java Card is a subset of the Java™ programming language that has been modified for embedded "card" type devices (such as the aforementioned UICC).

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICC-ID) and a specific authentication key (K). The network operator stores the association in a registry contained within the network's Authentication Center (AuC). After personalization the UICC can be distributed to subscribers.

Referring now to FIG. 1, one exemplary Authentication and Key Agreement (AKA) procedure using the aforementioned prior art USIM is illustrated in detail. During normal authentication procedures, the UE acquires the International Mobile Subscriber Identify (IMSI) from the USIM. The UE passes the IMSI to the Serving Network (SN) of the network operator or the visited core network. The SN forwards the authentication request to the AuC of the Home Network (HN). The FIN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE receives the RAND and AUTN, the USIM verifies if the received AUTN is valid. If so, the UE uses the received RAND to compute its own response (RES) using the stored K and the same algorithm that generated the XRES. The UE passes the RES back to the SN. The SN compares the XRES to the received RES and if they match, the SN authorizes the UE to use the operator's wireless network services.

The foregoing procedure of FIG. 1 is embodied within the physical media of the SIM card. Prior art SIM cards have at least two (2) distinct and desirable properties: (i) SIM cards provide cryptographically secured storage for SIM data (e.g., account information, encryption keys, etc.), and (ii) SIM cards cannot be easily cloned.

A prior art SIM card includes a processor and memory formed in a Universal Integrated Circuit Card (UICC). The SIM card may be filled with epoxy resin to prevent external probing of data signals on the UICC. Other tamper-proof structures may be included in the UICC if desired (e.g., shielding layers, masking layers, etc.) The SIM card has a secure interface to the processor, and the processor has an internal interface to the memory. The UICC receives power from the external device, which enables the processor to execute code from the memory component. The memory component itself is not directly accessible (i.e., internal filesystems are hidden from the user), and must be accessed via the processor.

During normal operation, the processor accepts a limited number of commands. Each of the commands is only conditionally accessible. Access conditions are constrained to the execution of commands to prevent unauthorized access. Access conditions may or may not be hierarchical e.g., authorization for one level may not automatically grant authorization for another level. For example, one set of access conditions may include: (i) always accessible, (ii) never accessible, (iii) accessible to a first account, (iv) accessible to a second account, etc. Conditional access is granted only after successful completion of an appropriate security protocol. Common methods for verifying identity may include a password or Personal Identification Number (PIN), challenge of a shared secret, etc.

Conditional access, limited command set, and protected memory space, ensure that the information stored within the SIM card is secure from external access. Cloning a SIM card would entail construction of a physical card, and construction of the internal filesystem and data. The combination of these features renders the physical SIM card impervious to practical forgery attempts.

Electronic Subscriber Identity Module (eSIM) Operation—

As a brief aside, the terms "conservation", "conserve" and "conserved", as used herein refer without limitation to an element (either physical or virtual), that cannot be trivially multiplied or diminished. For example, a conserved eSIM cannot be copied or replicated during normal operation.

Additionally, as used herein, the terms "uniqueness" as applied to an element (either physical or virtual), refers without limitation to the property whereby the element is the one and only element having a particular property and/or characteristic. For instance, a unique eSIM cannot have a duplicate eSIM.

As used herein, the term "security" generally refers to protection of the data and/or software. For example, access control data security ensures that the data and/or software associated with an access control client is protected from theft, misuse, corruption, publication and/or tampering, by unauthorized activities, and/or malicious third parties.

Furthermore, within the context of SIM operation, SIM security can further be subdivided into levels including: Level 1, Level 2, and Level 3. As used herein, Level 1 Security refers generally and without limitation to security mechanisms configured to protect the secrets and/or cryptographic materials contained within the eSIM (e.g., secure keys, cryptographic material, user history, etc.) from corruption, tampering, and/or malicious modification of the secrets and/or cryptographic materials by untrusted entities.

As used herein, Level 2 Security refers generally and without limitation to security mechanisms for preventing accidental and/or malicious cloning of an eSIM (conservation enforcement).

As used herein, Level 3 Security refers generally and without limitation to security mechanisms that ensure secure delivery to an intended user (e.g., an individual, enterprise, machine client, etc.)

For reasons which will be made clear hereinafter, each level of security is associated with a limited set of capabilities/responsibilities; thus, a device that provides Level 2 security can freely perform actions associated with Level 2, but must also be Level 1 security capable to affect Level 1 elements of the SIM. For example, an eSIM manager (described in greater detail hereinafter) ensures that an eSIM is not cloned; however, the eSIM manager does not necessarily have the ability to change cryptographic material contained within the eSIM, nor is the eSIM manager responsible for detecting corrupted cryptographic material.

The foregoing definitions of SIM security levels are purely illustrative, and are not intended to limit the descriptions herein. In fact, it is appreciated that the forgoing terminology should be considered "colloquial language" within the relevant arts, and likely to change in view of incipient evolution of the related industries and/or technologies.

It is appreciated that software is often more flexible than hardware; for example, software is easy to copy, modify, and distribute. Additionally, software can often be made cheaper, more power efficient, and physically smaller than hardware equivalents. Accordingly, while conventional SIM operation makes use of physical form factors such as cards (UICCs), current areas of research are focused toward virtualizing SIM operation within software. However, the sensitive nature of SIM data (e.g., subscriber specific information, etc.) requires special consideration. For example, various portions of SIM data are unique to subscribers, and should be carefully guarded from malicious third parties. Moreover, as previously stated, each SIM represents a contracted for amount of access to finite network resources; thus, duplication, destruction, and/or reclamation of SIMs must be managed to prevent over and/or under utilization of network resources, as well as subrogation of service provider fees or revenue. Accordingly, virtualized SIMs should satisfy the following properties: (i) security, (ii) uniqueness, and (iii) conservation. Moreover, such properties should ideally be afforded at a cost comparable to existing network infrastructures.

Incipient solutions for SIM operation emulate an UICC as a virtual or electronic entity such as e.g., a software application, hereafter referred to as an Electronic Universal Integrated Circuit Card (eUICC). The eUICC is capable of storing and managing one or more SIM elements, referred hereafter as Electronic Subscriber Identity Modules (eSIM). However, solutions for virtualized eSIM operation must provide equivalent (if not improved) security to existing security capabilities already provided by prior art UICCs.

In particular, various aspects of the present invention enable secure electronic delivery of access control clients and associated network operator and user data to deployed devices. In one exemplary embodiment, a network infrastructure is disclosed that enables delivery of electronic subscriber identity modules (eSIMs) to secure elements (e.g., electronic Universal Integrated Circuit Cards (eUICCs), eUICC appliances, etc.). As previously noted, the network infrastructure enables management and movement of an inventory of eSIMs. Moreover, various functions of the disclosed infrastructure can be flexibly partitioned and/or adapted such that individual parties (e.g., device manufacturers, network carriers, third party retailers, customers, etc.) can host portions of the infrastructure; such piecemeal solutions can be optimized for each individual party's needs. Still further, exemplary embodiments of the present invention can provide redundancy, thus ensuring maximal uptime for the overall network (or the portion thereof).

Methods—

Figure 2:
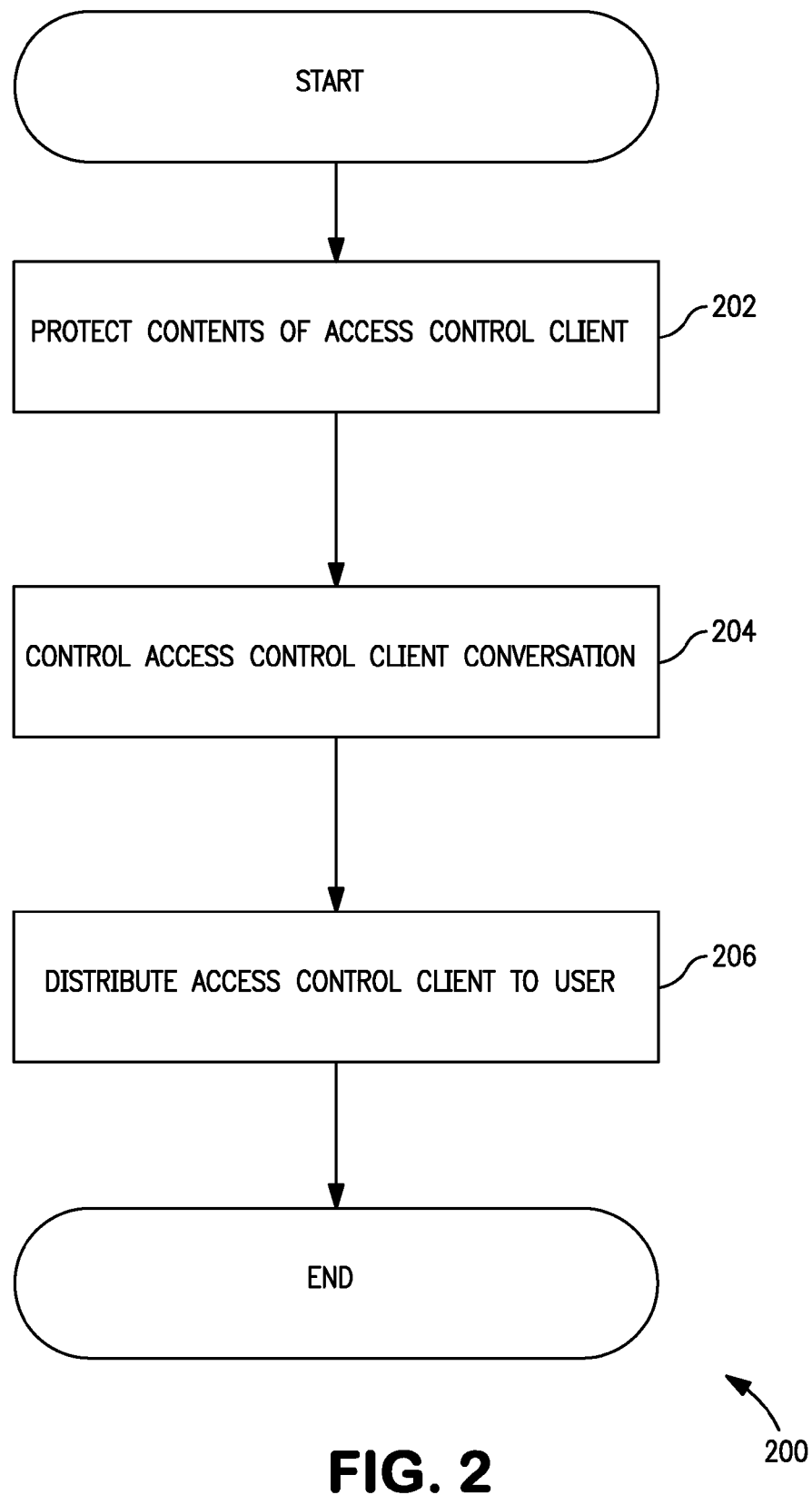
FIG. 2 is a logical flow diagram illustrating one embodiment of a generalized method for efficiently distributing and storing virtual access control clients within a network, according to the present invention.

Referring now to FIG. 2, a generalized method 200 for distributing access control clients within a network is disclosed.

At step 202 of the method 200, the contents of one or more access control clients (e.g., eSIMs) are protected according to a first standard trusted relationship. In one exemplary embodiment, the first trusted relationship is configured to protect the secrets and/or cryptographic materials contained within the eSIM (e.g., secure keys, cryptographic material, user history, etc.). For example, the first trusted relationship is based on a security module (implemented within hardware or software) that is configured to encrypt or decrypt access control clients according to unique device keys and endorsement certificates. In particular, the security module is configured to encrypt access control clients for delivery to a desired destination device, or decrypt access control clients received from a source device. In one exemplary embodiment, all eSIMs must be encrypted when being transferred between devices (i.e., eSIMs cannot be transferred to any other device in an unencrypted form). For example, as described in greater detail within U.S. Provisional Patent Application Ser. No. 61/407,866 filed on Oct. 28, 2010 and entitled "METHODS AND APPARATUS FOR STORAGE AND EXECUTION OF ACCESS CONTROL CLIENTS" (now U.S. patent application Ser. No. 13/080,521 filed on Apr. 5, 2011, of the same title) previously incorporated herein, each device is given unique device keys and endorsement certificates which can be used to provide updates and/or eSIMs to the user equipment in the "field". The user equipment can trust an encrypted eSIM delivered with the device key, and the security module can trust information encrypted with the device's key.

Figure 2A:
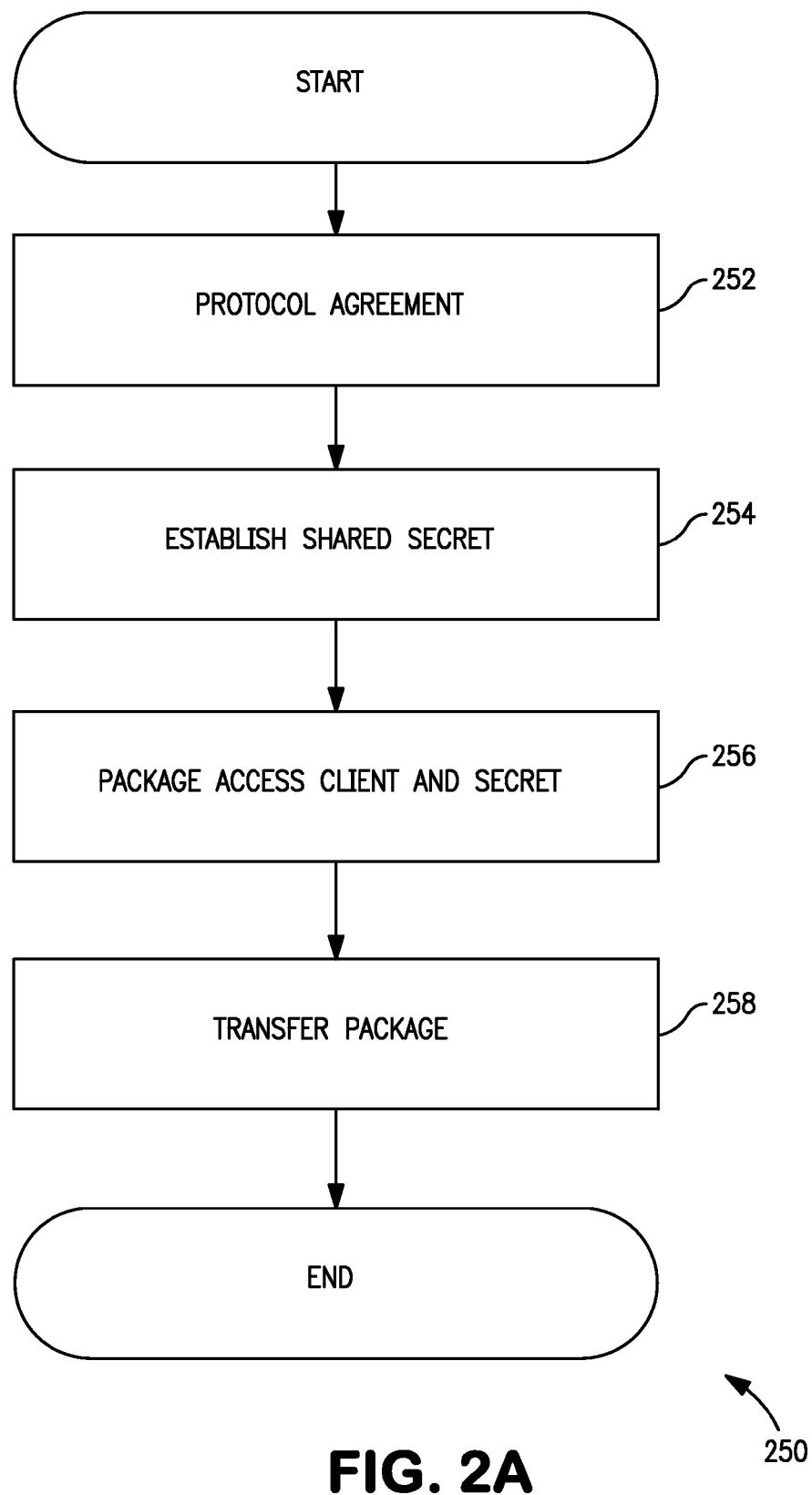
FIG. 2A is a logical flow diagram illustrating one embodiment of an exemplary method for storing and transferring access control clients in accordance with a first trusted protocol, according to the present invention.

As a brief aside, FIG. 2A illustrates one exemplary scheme 250 for storing and transferring access control clients in accordance with a first trusted protocol. In one implementation, at least one device is a eUICC appliance that is embodied within a Hardware Security Module (HSM) that can manage the storage of one or more eSIMs. In some embodiments, the HSM stores the encrypted eSIM locally, or alternately, encrypts the eSIM for storage on remote media (in some cases, insecure filesystems). In an alternate implementation, at least one device is a eUICC appliance that is embodied within a physical SIM card form factor (e.g., enabling legacy form factor receptacle reuse). In still another alternate, at least one device is a hardened device, such as a mobile phone including a eUICC appliance embodied within a secure element (i.e., the secure element cannot be removed from the device without destroying or otherwise compromising the integrity of the device).

At step 252 of the method 250, the source device and destination device agree on a protocol. In one embodiment, the protocol type is based on a version of software identified e.g., in plain text. In other embodiments, the protocol type is inherent to an otherwise ciphered initial communication. For example, an encrypted 256-bit challenge may inherently specify a particular protocol or set of protocols, whereas an unencrypted challenge may inherently specify a different protocol. In still other embodiments, the protocol may be based upon a discovery process. For example, in some variants, devices may be registered with a directory service, where a registry includes information such as identifier, network address, supported protocol types, etc.

In one exemplary embodiment, the protocol type is determined by a signed certificate issued by a mutually trusted issuer authority. A digital certificate may include, but is not limited to, for example: (i) a serial number (to uniquely identify the certificate), (ii) the device being certified, (iii) the signature algorithm used to create the signature, (iv) the issuer that verified the information and signed the certificate, (v) a validity range (e.g., valid from, valid until, etc.), (vi) an encryption key, and/or (vii) a thumbprint or verification hash (to verify the legitimacy of the certificate). Digital certificates are well known in the related arts, and will not be further described.

In one such variant, the mutually trusted issuer authority is an activation authority e.g., the Mobile Network Operator (MNO) authentication center (AuC). In other variants, the mutually trusted issuer authority is a trusted third party e.g., a SIM vendor, the device manufacturer, etc. The mutually trusted issuer authority need not be the same for both devices. For example, in some embodiments, a system may have multiple trusted entities (e.g., multiple accepted MNOs, multiple trusted device manufacturers, etc.). Moreover, in certain systems, a trusted entity can be a root of trust for another unknown entity (e.g., the trusted entity provides assurance that the unknown entity can also be trusted). Such trust "chains" can be extended across an arbitrary number of intermediate devices; each intermediate device is chained to the trust level of its predecessor, which extends to the trusted root entity.

In other examples, eUICC appliances may support any appliance device that is compliant to a standardized specification, etc. Similarly, to ensure backward compatibility, future incarnations of a eUICC appliance may also support legacy eUICC appliances, etc.

The available devices and/or accepted protocols for available devices may be stored for example within a lookup directory service. Such directory service type applications are common within the network infrastructure arts. For instance, multiple arrays of appliances can be further matched with a directory service server configured to provide connection information for each of the appliances. A requester party (either source or destination) can request information from the directory service.

In some embodiments, the protocols are codified according to a software version or revision. For example, the devices may verify that the other device is of an acceptable software version or revision. Alternately, the source and destination devices may agree to an informal protocol; for example, the devices may be required to negotiate or determine a protocol dynamically. In yet other embodiments, no protocol negotiation is necessary (i.e., systems which only support a single transfer protocol).

The transfer protocol may specify, inter alia, types of challenge response protocols, unique identifier selection, transfer encryption, access control client management (e.g., deletion procedures, acknowledgement procedures, etc.) during transfer. As previously indicated, in order to ensure that conservation and uniqueness properties of an access control client are retained during transfer, the access control client is encrypted for the destination device, and deleted from the transferring device. For example, the transfer protocol may specify: (i) if acknowledgement of reception is required, (ii) if retransmission is allowed when transmission fails, (iii) an acceptable number of retry attempts, and/or (iv) under what conditions the source device can delete the encrypted access control client.

It will be appreciated that the source device may delete and/or deactivate the encrypted access control client at different times and/or under different conditions, as may be convenient or required under the various scenarios. In some embodiments, deletion may occur some time after transfer. Such embodiments may be of particular use in bulk transfers. Alternately, the access control client may be deactivated some time before transfer. Similarly, in other embodiments, a "validity window" may also be specified for transfer, such that a particular transfer must be accomplished within a prescribed temporal window to be considered valid.

Other considerations include, inter alia, device considerations, and/or access control client considerations. For example, some devices may only be allowed to receive (or transmit) an access control client. In one such implementation, a mobile device may be limited to only receive an eSIM (once assigned, it cannot be returned, etc.) Alternately, certain devices may be used only as a "one-time" transfer (e.g., a disposable device for providing an eSIM once). In some cases, a device may be more (or less) secure than the peer device. For example, in one exemplary embodiment, user equipment may have more rigid security requirements than a eUICC appliance; the eUICC appliance may be protected via other measures (e.g., secure infrastructure, etc.). Secure user equipment can also transfer an eSIM to a less secure eUICC appliance, provided the less secure eUICC appliance implements a minimum level of security. Similarly, in some cases, access control clients have transfer limitations, including but not limited to: (i) a total number of transfers allowed, (ii) destination device restrictions, etc.

Moreover, it is appreciated that communication method may have significant impact on transfer protocol considerations. Network infrastructure transfers may use high bandwidth protocols and media (e.g., T3, T1, Sonet (Synchronous Optical Networking), Gigabit Ethernet, etc.), whereas consumer-based transfers may be performed over lower bandwidth connections (e.g., cellular access, WLAN (Wireless Local Area Network), Ethernet, etc.). Different use scenarios may also have different requirements for handshaking, transfer time requirements, etc. For example, a SIM vendor may transfer a large number of eSIMs to a eUICC appliance (e.g., such as to facilitate SIM delivery or other functions). Similarly, in another example, a centralized large repository of eSIMs can be freely transferred among a number of eUICC appliances. The eUICC appliances can freely transfer eSIMs from appliance to appliance, to facilitate load management, etc. Handshaking requirements for these bulk transfer scenarios are less important, as the eSIMs are not in circulation (acknowledgements can be lumped together at the end of the transfer, rather than for each individual eSIM).

Customer applications can have much slower transfer rates, but handshaking is more important, as the eSIM should be robustly delivered, and immediately available for use. In some variants, failure to complete the handshaking process will automatically trigger a retry attempt. For example, a eUICC appliance, SIM Provisioning Server (SPS), or similar entity may directly transfer an eSIM to service an impromptu eSIM request from user equipment (UE), or an application executing from a desktop or portable computer. In another such example, customer-based applications may execute a small internalized appliance capable of storing one or more eSIMs (e.g., one for work, one for personal use, several for roaming access, etc.) enabling a customer to transfer an eSIM among their various devices.

At step 254 of the method 250 of FIG. 2A, the source and destination devices establish a shared secret. In one exemplary embodiment, the devices verify the peer device identity by inspecting a digital signature, and if the signature is valid, exchanges (or agrees to exchange) a challenge, unique identifier, or other security token for encryption with the access control client.

For example, the devices may utilize a challenge and response type handshake; where any trusted device knows a common secret (e.g., a common key, a set of keys, etc.), which can be used to generate a number of challenges and associated responses. Devices can trust an unknown device, provided they can generate proper challenges, and/or appropriate responses.

In another example, the devices may utilize a unique identifier that is generated by the destination device with the access control client request. The source device includes the unique identifier with the access control client to identify the serviced request.

In yet other embodiments, the devices may verify their peer device with a trusted third party (e.g., the trusted third party provides each of the devices a session key). Such relationships can be verified directly or indirectly. For example, the peer devices may directly query a trusted third party before executing the transfer, or alternately each device may present a certificate signed by trusted third parties, etc.

Yet other types of cryptographic arrangements and trust scenarios will be recognized for use with the invention by those of ordinary skill given the present disclosure.

At step 256, the source device packages the access control client with the secret (e.g., challenge, unique identifier, or other security token). In one exemplary embodiment, the package is additionally encrypted using the destination device's public key. In one variant, the source device must first decrypt the access control client with its own private key, prior to re-encrypting the access control client.

Once encrypted with the destination device's public key, only the destination device can decrypt the access control client for use. For example, each eUICC appliance has a unique device public/private key pair and endorsement certificate. The public/private key pair is based on a secret private key, and a publishable public key. Public/private key schemes are considered "asymmetric", as the key used to encrypt and decrypt are different, and thus the encrypter and decrypter do not share the same key.

It is further acknowledged that steps 256 and 254 (among others) may be further combined, subdivided, and/or reversed. For example, in one embodiment, the source device determines a session key, and encrypts the access control client with the session key, the resulting package being further wrapped with the destination device's public key. In one such variant, the session key is determined by the destination device at the time of receipt.

Additionally, in some embodiments, the packages are further digitally signed to provide further verification of the source device. The destination device can check the digital signature, to verify that the package (e.g., the access control client and unique identifier, etc.) originated from the source device. Moreover, it is widely appreciated that digital signatures are merely a subset of electronic signatures, consequently other forms of source verification can similarly be employed including but not limited to: user identification (password, biometrics, etc.), electronic identification, etc.

At step 258, the packaged access control client is transferred from the source to the destination device. The destination device verifies the shared secret, and if the verification is successful, stores the encrypted access control client for future use. In one embodiment, the access control client is deleted, deactivated, or otherwise rendered unusable, at the source device prior to enabling the access control client for the destination device (e.g., prior to transfer, prior to completing transfer, prior to acknowledging transfer success, etc.).

Referring again to FIG. 2, at step 204, the access control client conservation is controlled according to a second standard trusted relationship. In one exemplary embodiment, the second trusted relationship is configured to prevent accidental and/or malicious cloning of an eSIM. For instance, the second standard trusted relationship may be managed by a security module configured to encrypt an eSIM for itself or another device.

Figure 2B:
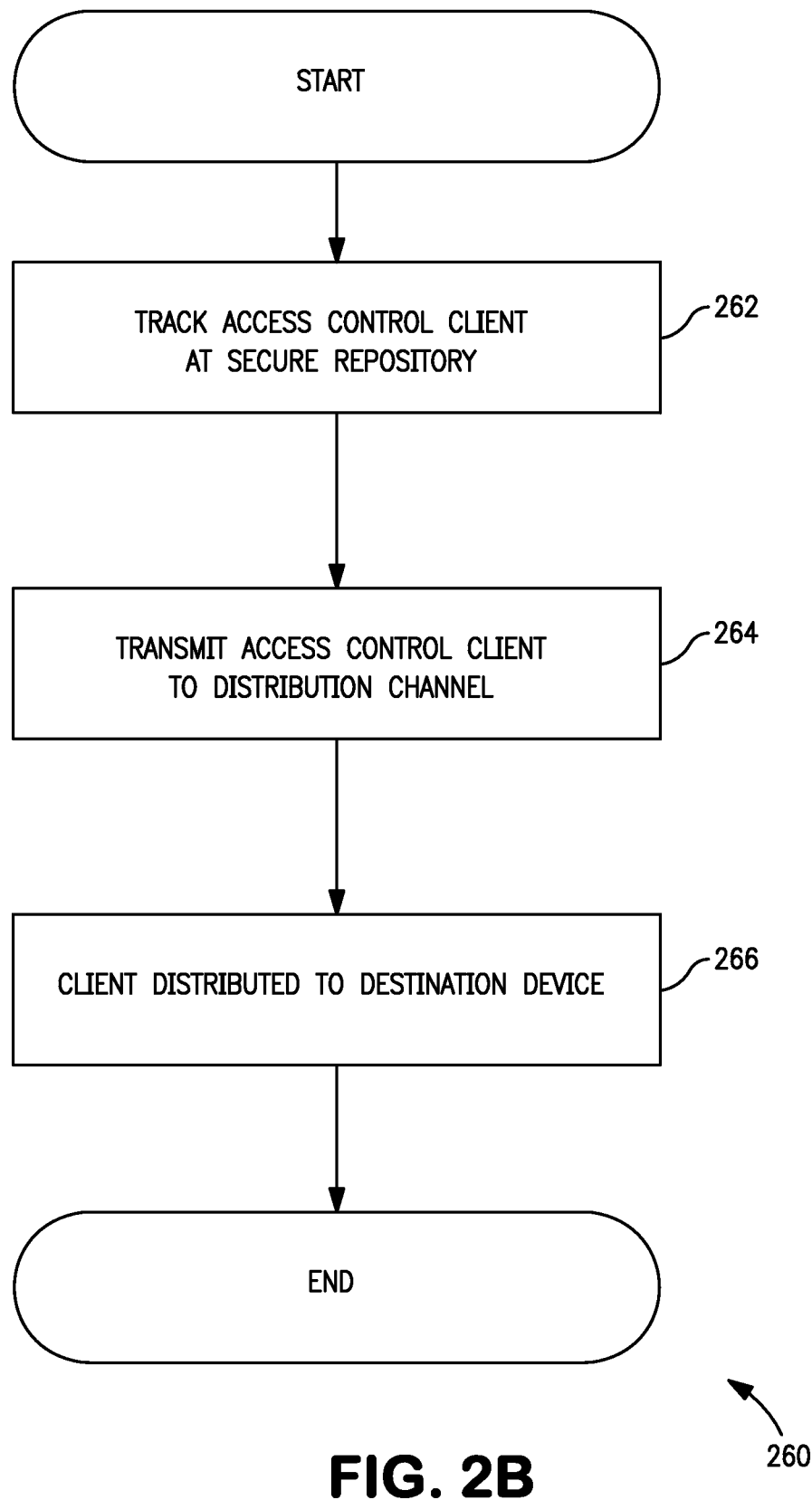
FIG. 2B is a logical flow diagram illustrating one embodiment of an exemplary method for controlling access control client conservation in accordance with a second trusted protocol, according to the present invention.

Referring now to FIG. 2B one exemplary scheme 260 for controlling access control client conservation in accordance with a second trusted protocol is illustrated. At step 262 of the method 260, one or more access control clients (e.g., eSIMs) are stored and tracked within secure repositories. In one embodiment, the secure repository includes one or more of a tracking database, a security module for encrypting and decrypting access control clients based at least in part on information derived from the tracking database, and secure storage for access control clients.

The tracking database includes information indicative of access control client distribution, and access control client transaction data. In one exemplary implementation of this embodiment, the transaction data includes a listing of deployed eSIMs, and the challenges issued, and/or unique identifiers used, etc. For example, a secure protocol between transferring devices ensures that every eSIM of the distributed eSIM population is only transferred among trusted devices. Alternately, the secure protocol may ensure that only encrypted eSIMs are distributed to devices which are not trusted. In some variants, the trusted protocol is based on a challenge/response protocol. In alternate variants, the trusted protocol is based on an exchange of a digital security certificate signed by a mutually trusted third party.

In one exemplary embodiment, the secure repository ensures that access control clients are only transferred between devices that conform to a standard trusted relationship. The trusted relationship further specifies that when a first device successfully transfers an access control client, the first device deletes, deactivates or otherwise renders its copy unusable. In this manner, the access control client can remain unique and conserved throughout transfer.

In various embodiments, the tracking database additionally tracks access control client qualities including for example: (i) access control clients which have been distributed to customers, (ii) access control clients which have not yet been distributed (awaiting activation), (iii) activated access control clients, (iv) deactivated access control clients, (v) access control clients awaiting activation, (vi) access control clients assigned to a device, (vii) access control clients assigned to an account, and (viii) access control clients available for assignment. Similarly, the tracking database may track states such as for example: (i) current state, (ii) expected state, (iii) previous state, (iv) last known state, and (v) initial state. Common examples of a state variable include, but are not limited to, a counter value, an encrypted value, a challenge variable, a response variable, etc.

For example, in one exemplary challenge-response scheme, a challenge variable is an input cryptographic vector, which can be manipulated, transformed, and/or calculated to generate a response vector. The manipulation, transformation, and/or calculation is a secret protected by the access control client of the device. In other example, a counter-based unique identifier uses a unique counter value as a secret that is protected by the access control client of the device. Common other types of states may be based on a large and pseudorandom state machine, such as for example, a Linear Feedback Shift Register (LFSR) based state machine or other such mechanism.

The security module is in one embodiment configured to encrypt or decrypt access control clients based at least in part on instructions from the tracking database. In particular, the security module is configured to encrypt access control clients for delivery to the desired destination device. In fact, in one exemplary embodiment, all transferred eSIMs must be encrypted (i.e., eSIMs cannot be transferred to any device in their unencrypted form). Similarly, the security module is configured to decrypt access control clients received from user devices. The user equipment can trust an encrypted eSIM delivered with the device key, and the security module can trust information encrypted with the device's key (as guaranteed in step 202)

Similarly, in some embodiments, the security module is further configured to decrypt an eSIM for SIM application execution. For example, in one scenario, a user device can decrypt an eSIM for use. The eSIM application generally encompasses access control clients such as the aforementioned USIM, CSIM, ISIM, SIM, RUIM, etc. It is further understood that each eSIM can be associated with a user account, thus an "eSIM" may broadly encompass multiple access control clients (e.g., a user may have a USIM and a SIM associated with the same eSIM account).

In yet another scenario, the security module may encrypt an eSIM for itself. For example, a security module may encrypt an eSIM for itself, and store the encrypted eSIM to persistent storage for later use.

In some embodiments, security module encryption scheme may be based on an asymmetric key pair; or alternately, the security module encryption scheme may use a symmetric key pair. As a brief aside, a public/private key pair is based on a secret private key, and a publishable public key. Public/private key schemes are considered "asymmetric", as the key used to encrypt and decrypt are different, and thus the encrypter and decrypter do not share the same key. In contrast "symmetric" key schemes utilize the same key (or trivially transformed keys) for both encryption and decryption. The Rivest, Shamir and Adleman (RSA) algorithm is one type of public/private key pair cryptography that is commonly used within the related arts, but it will be recognized that the present invention is in no way limited to the RSA algorithm (or for that matter asymmetric or symmetric key pairs).

Public/private cryptography schemes can be used to encrypt a message, and/or generate signatures. Specifically, a message can be encrypted with a private key, and decrypted with the public key, thereby assuring that the message has not been altered in transit. Similarly, a signature generated with the private key can be verified with the public key, assuring that the entity generating the signature is legitimate. In both uses, the private key is kept hidden, and the public key is freely distributed.

In one exemplary embodiment, the secure storage is volatile computer-readable media that is configured to store access control client data and files. The secure storage is a shared memory containing encrypted access control clients that is coupled to both the tracking databases and security modules. Shared memory access implementations allow both the tracking databases and security modules to operate on a coherent database (e.g., no requirement for synchronizing data between disparate memory pools). Volatile memory requires power to retain memory contents; which can be desirable for certain implementations because removing volatile memory will erase the memory (further improving security). Volatile memory is also generally faster than equivalent non-volatile memory.

In some embodiments of the invention, the secure storage enables multiple devices access to the same pool of access control clients. The secure storage may not be physically coupled between the tracking databases and security modules, but may be accessible via a network. In distributed facility arrangements, the secure storage may not even be logically shared. For example, remote databases may locally cache portions of the access control client data and files, and periodically synchronize between one another to ensure that all devices are in agreement.

The secure storage may also be physically and/or logically protected. For example, the secure storage may be protected within a Hardware Security Module (HSM), where the HSM is configured to destroy itself if forcibly opened/accessed. More generally, the tracking database, security modules, and secure storage will typically be protected within a trusted boundary. Common implementations of trust boundaries include both physical boundaries (e.g., physical isolation, etc.), and/or logical boundaries (e.g., encrypted communication, etc.). Furthermore, while the foregoing logical entities (tracking database, security modules, and secure storage) are primarily described as coherent or unitary entities, it is appreciated that in most network infrastructures, these logical entities will be composed of multiple discrete apparatus (which may even be geographically disparate) operating in tandem.

For example, in one embodiment, the tracking database is a community of multiple discrete database apparatus that execute tracking database software, and communicate among one another to maintain data synchronization. Similarly, the logical security modules can be composed of multiple discrete security modules; in one such variant, the security modules are entirely directed by the tracking database and do not synchronize with one another.

Referring again to FIG. 2B, at step 264, one or more access control clients are transmitted to one or more distribution locations from the secure repositories. In one exemplary embodiment, a distribution location is an access control client depot that is configured to store encrypted access control clients for distribution to their respective destinations. Since the access control clients are encrypted and cannot be used by devices other than the destination device, multiple depots can be loaded with copies of the encrypted access control clients.

In one exemplary implementation, the encrypted access control clients are stored such that access control clients can be delivered in an uncontrolled fashion (i.e., each of the depots does not need to synchronize its transactions with the other depots, or notify a network centralized entity). Each of the copies is encrypted for the destination device, where the destination device is a trusted device. In one such embodiment, the destination device is configured to download the encrypted access control client only once. Once the access control client has been downloaded, the other copies of the access control client are "stale" and can be removed, deleted, or rendered inactive thereafter. Malicious third parties cannot decrypt the access control client, nor activate an encrypted copy (stale or otherwise).

The secure repositories may provide access control clients to the one or more distribution locations in bulk. For example, a SIM vendor may provide a large number of eSIMs in large lots (e.g., thousands of eSIMs at a time). Alternately, the secure repository may provide one eSIM at a time; for example, in some embodiments, a user may "park" their unused eSIMs within an eSIM depot, either temporarily (such as to transfer to another device), or for longer term storage.

Various embodiments of the present invention additionally include the addition of metadata that is associated to each access control client stored within the distribution locations. The metadata is securely stored, but can be accessed by the distribution apparatus to facilitate inventory management. For example, an eSIM depot may encrypt metadata with its own key (as opposed to a key specific to an eSIM, or destination device), such that the eSIM depot can properly identify an encrypted eSIM. Common examples of metadata may include, but are not limited to: identifying information, issuer information, network information, account information, status information, etc.

In some implementations, the metadata can be further queried and/or accessed by external entities. For example, an eUICC appliance may need to periodically check or update eSIM depot metadata (e.g., to determine inventory, identify stale information, etc.). In another such example, a mobile device user can request information on parked eSIMs, etc. located at a particular eSIM depot.

At step 266, the requested access control client is distributed from at least one of the distribution locations to a destination device. Due to the flexibility of distribution models, many different schemes are envisioned, and will be recognized by those of ordinary skill when provided the present disclosure. The following subsections describe several eSIM distribution schemes that are illustrative of the broad variety of schemes suitable for operation in accordance with various aspects of the present invention.

Referring back to FIG. 2, at step 206 of the method 200, the access control client is distributed to users for use according to a third trusted relationship. In one exemplary embodiment, since the access control clients are encrypted and cannot be used by devices other than the destination device, multiple depots can be loaded with copies of the encrypted access control clients.

In one exemplary implementation, the encrypted access control clients are stored such that access control clients can be delivered in an uncontrolled fashion (i.e., each of the depots does not need to synchronize its transactions with the other depots, or notify a network centralized entity). Each of the copies is encrypted for the destination device, where the destination device is a trusted device. In one such embodiment, the destination device is configured to download the encrypted access control client only once. Once the access control client has been downloaded, the other copies of the access control client are "stale" and can be removed, deleted, or rendered inactive thereafter. Malicious third parties cannot decrypt the access control client, nor activate an encrypted copy (stale or otherwise).

The secure repositories may provide access control clients to the one or more distribution locations in bulk. For example, a SIM vendor may provide a large number of eSIMs in large lots (e.g., thousands of eSIMs at a time). Alternately, the secure repository may provide one eSIM at a time; for example, in some embodiments, a user may "park" their unused eSIMs within an eSIM depot, either temporarily (such as to transfer to another device), or for longer term storage.

Various embodiments of the present invention additionally include the addition of metadata that is associated to each access control client stored within the distribution locations. The metadata is securely stored, but can be accessed by the distribution apparatus to facilitate inventory management. For example, an eSIM depot may encrypt metadata with its own key (as opposed to a key specific to an eSIM, or destination device), such that the eSIM depot can properly identify an encrypted eSIM. Common examples of metadata may include, but are not limited to: identifying information, issuer information, network information, account information, status information, etc.

In some implementations, the metadata can be further queried and/or accessed by external entities. For example, an eUICC appliance may need to periodically check or update eSIM depot metadata (e.g., to determine inventory, identify stale information, etc.). In another such example, a mobile device user can request information on parked eSIMs, etc. located at a particular eSIM depot.

Apparatus (Example Architecture)—

Figure 3:
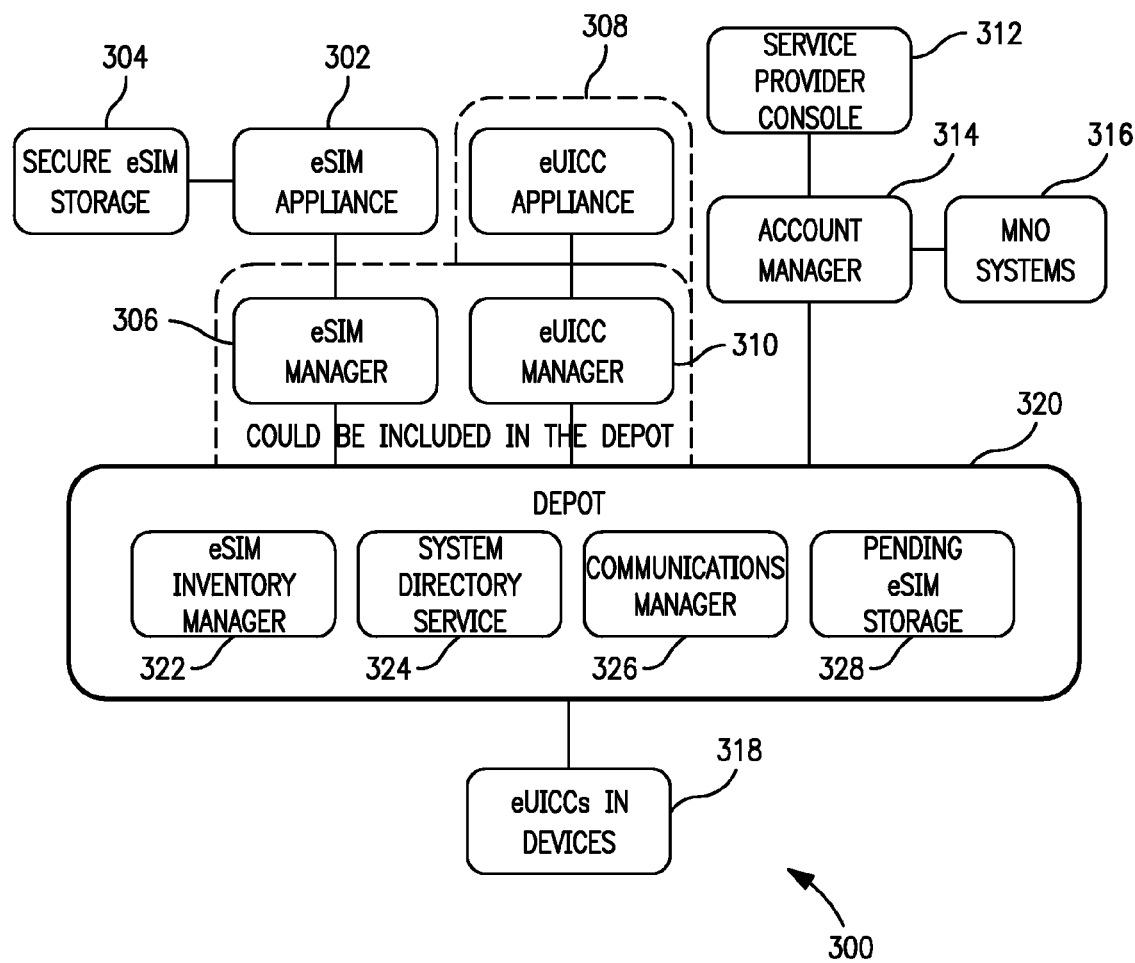
FIG. 3 is a block diagram of one exemplary network architecture useful for distributing and storing access control clients, according to the present invention.

Consider the exemplary system illustrated in FIG. 3; the system 300 includes one or more: (i) eSIM appliances 302, (ii) secure eSIM storages 304, (iii) eSIM managers 306, (iv) eUICC appliances 308, (v) eUICC managers 310, (vi) service provider consoles 312, (vii) account managers 314, (viii) Mobile Network Operator (MNO) systems 316, (ix) eUICCs that are local to one or more devices 318, and (x) depots 320. Moreover, in one embodiment, each depot further includes one or more: (xi) eSIM inventory managers 322, (xii) system directory services 324, (xiii) communications managers 326, and (xiv) pending eSIM storages 328.

Each of the foregoing entities is now described.

eUICC Appliance—

In one exemplary embodiment, the eUICC appliance 308 is responsible for enforcing Level 1 security e.g., ensuring that the eSIM secret materials (e.g., secure keys, cryptographic material, user history, etc.) are protected by the eUICC software and hardware. The eUICC appliance is trusted by device eUICCs to sign operating system (OS) updates, updates to certificates and other eUICC specific payloads. For example, the eUICC appliance can sign notifications or commands to a device eUICC to perform administrative tasks; e.g., checking for an eSIM update, updating the eUICC's security credentials, etc. In one such exemplary embodiment, the eUICC appliance is configured to sign notifications and/or commands issued by an eUICC manager.

In one exemplary embodiment, a eUICC appliance is operated by a trusted authority. The eUICC appliance is configured to generate signatures for notifications or commands which enables the device to verify the notification or command as being authentic. For example in one such variant, the trusted authority is e.g., the eUICC manager 310. Moreover, in certain systems, a trusted entity can be a root of trust for another unknown entity (e.g., the trusted entity provides assurance that the unknown entity can also be trusted). Such trust "chains" can be extended across an arbitrary number of intermediate devices; each intermediate device is chained to the trust level of its predecessor, which extends to the trusted root entity.

Figure 4:
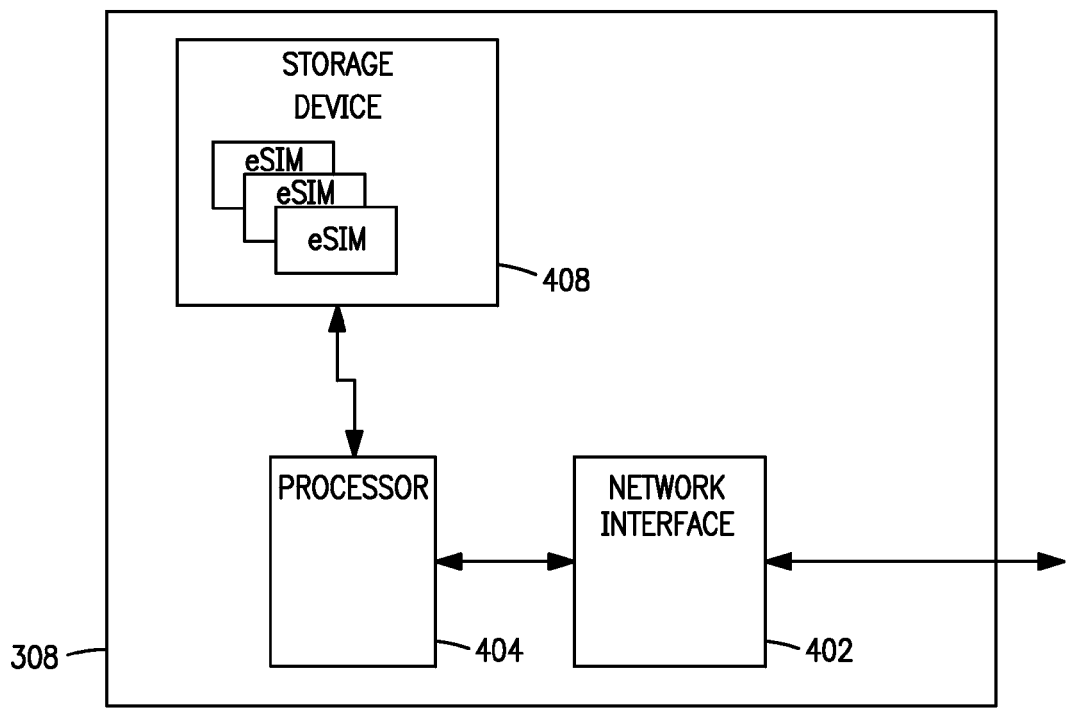
FIG. 4 is a logical block diagram of one exemplary embodiment of an electronic Universal Integrated Circuit Cards (eUICC) appliance, according to the present invention.

FIG. 4 illustrates one exemplary embodiment of a eUICC appliance 308 in accordance with the present invention. The eUICC appliance may comprise a stand-alone entity, or be incorporated with other network entities (e.g., a Service Provisioning Service (SPS), etc.). As shown, the eUICC appliance 308 generally includes a network interface 402 for interfacing with the communications network, a processor 404, and a storage apparatus 408. The network interface is configured for connection to the network infrastructure 300 of FIG. 3, so as to provide access to other network appliances, and direct or indirect access to one or more mobile devices, although other configurations and functionalities may be substituted.

In one configuration, the eUICC appliance is a Hardware Security Module (HSM). A HSM includes one or more secure elements for managing a number of access control clients. In some embodiments, the access control clients are stored directly at the HSM. Alternatively, the access control clients are encrypted and stored in external storage. In such external (e.g., remote) storage embodiments, the encryption ensures that the access control clients are secure, even when stored on physically unsecure media.

As shown, the storage apparatus 408 is adapted to store an array of access control clients. In one embodiment, a eUICC appliance stores an array of eSIMs. In one such implementation, each eSIM includes a small file system that includes computer readable instructions (the eSIM program) and associated data (e.g., cipher keys, integrity keys, etc.). In addition, each eSIM is additionally encrypted with the eUICC appliance's public key. Accordingly, each eUICC can only be decrypted by the eUICC appliance. In some embodiments, each encrypted eSIM is further encrypted with a unique identifier, challenge, or challenge response. In some embodiments, the encrypted components is further stored as a Binary Large Object (BLOB).

eSIM Appliance—

In one exemplary embodiment, the eSIM appliance 302 is responsible for enforcing Level 2 security (preventing accidental and/or malicious cloning of an eSIM) when an eSIM is not deployed to a user device (e.g., while the eSIM is stored within network appliances, network entities, etc.) The eSIM appliance can encrypt eSIMs for another eSIM appliance or user device based eUICC; similarly, the eSIM appliance can decrypt and verify eSIMs received from another eSIM appliance or user device based eUICC. In some embodiments, the eSIM appliance is the sole entity that can sign and encrypt eSIMs. In alternate embodiments, sufficiently secure devices (e.g., user device eUICCs, etc.) can be trusted to perform these functions.

Each eSIM appliance enforces Level 2 security (eSIM conservation) by guaranteeing that an eSIM that is encrypted and signed for another destination is deleted from the appliance, ensuring that only one version of the eSIM is deployed. In some embodiments, one or more eSIM appliances 302 can be combined with one or more eSIM managers 306 to manage a common pool of eSIMs as a clustered entity. Each eSIM manager of the system manages a portion of the pool of eSIMs within the cluster. eSIMs can be imported into the cluster, exported from the cluster, and transferred within each of the entities of the cluster. In yet other embodiments, one or more eSIM appliances can be subsumed within a larger depot entity. Both depots and eSIM managers are described in greater detail hereinafter.

Figure 5:
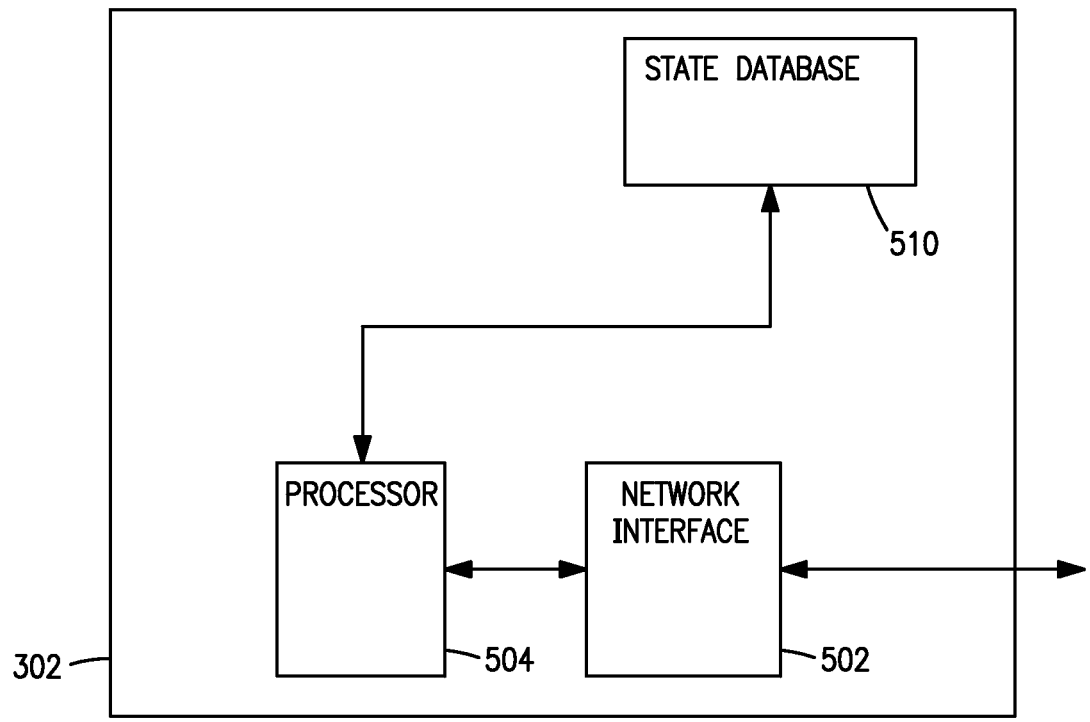
FIG. 5 is a logical block diagram of one exemplary embodiment of an electronic Subscriber Identity Module (eSIM) appliance, according to the present invention.

FIG. 5 illustrates one exemplary embodiment of an eSIM appliance 302 in accordance with the present invention. The eSIM appliance may comprise a stand-alone entity, or be incorporated with other network entities (e.g., a Service Provisioning Service (SPS), etc.). As shown, the eSIM appliance 302 generally includes a network interface 502 for interfacing with the communications network, a processor 504, and a storage apparatus 508. The network interface is configured for connection to the network infrastructure 300 of FIG. 3, so as to provide access to other network appliances, and direct or indirect access to one or more mobile devices, although other configurations and functionalities may be substituted.

In the illustrated embodiment of FIG. 5, the eSIM appliance 302 includes at least a SIM database 510 running on the processor 504. Although illustrated as a single application running on the eUICC appliance, it is appreciated that the foregoing database functionality may comprise a distributed application running on a plurality of devices in data communication with one another.

The SIM database application processes requests that include: (i) a request to store an eSIM, (ii) a request to transfer a currently stored eSIM.

The SIM database application is configured to manage the available eSIMs. As illustrated in FIG. 5, the database may provide information relating to the particular eSIM BLOB, the devices authorized to use the eSIM, the current state and/or the current status of the eSIM ("available", "not available", "stale", etc.). Additional information may be maintained as well. The database application is configured to update or change information stored in the database.

When another device requests an eSIM from the eSIM appliance 500, the database application retrieves the current state of the requested eSIM. This information can be used to determine if the requested eSIM can be provided. This validity check can be performed at an activation service, at the eSIM appliance, be shared, or occur at yet other locations; e.g., by comparing the state at the activation service versus the last known state at the eSIM appliance. Similarly, when another device transfers an eSIM to the eSIM appliance 500, the database application is responsible for updating the current state of the transferred eSIM.

Secure eSIM Storage—

In one embodiment, secure eSIM storage 304 is configured to store encrypted eSIMs and associated eSIM information (e.g., eSIM state, eSIM metadata, etc.) for the aforementioned eSIM appliances. Secure eSIM storage provides additional redundancy for eSIM appliances 302; during normal operation, failures within eSIM appliance memory can be recovered by resurrecting eSIMs that have been previously stored within secure eSIM storage.

eSIM Manager—

In one exemplary embodiment, the eSIM manager 306 is responsible for enforcing Level 3 security (e.g., overseeing that a given eSIM is delivered to the correct user). The eSIM manager tracks, verifies, and authorizes eSIMs from an inventory of eSIMs. For example, an eSIM manager can manage one or more eSIMs, including ownership information, unique codes, etc. During operation, the eSIM manager can add uniqueness to the eSIM (e.g., embedding a unique code) to verify that the eSIM is unique. The unique eSIM can be stored, and when retrieved the eSIM can be verified using the embedded uniqueness properties. Similarly, the eSIM manager can allocate an eSIM to another entity for use (such as an Account Manager 314 for pre-reserved SIMs, or Inventory Manager for cold unallocated eSIMs, etc.).

Figure 6:
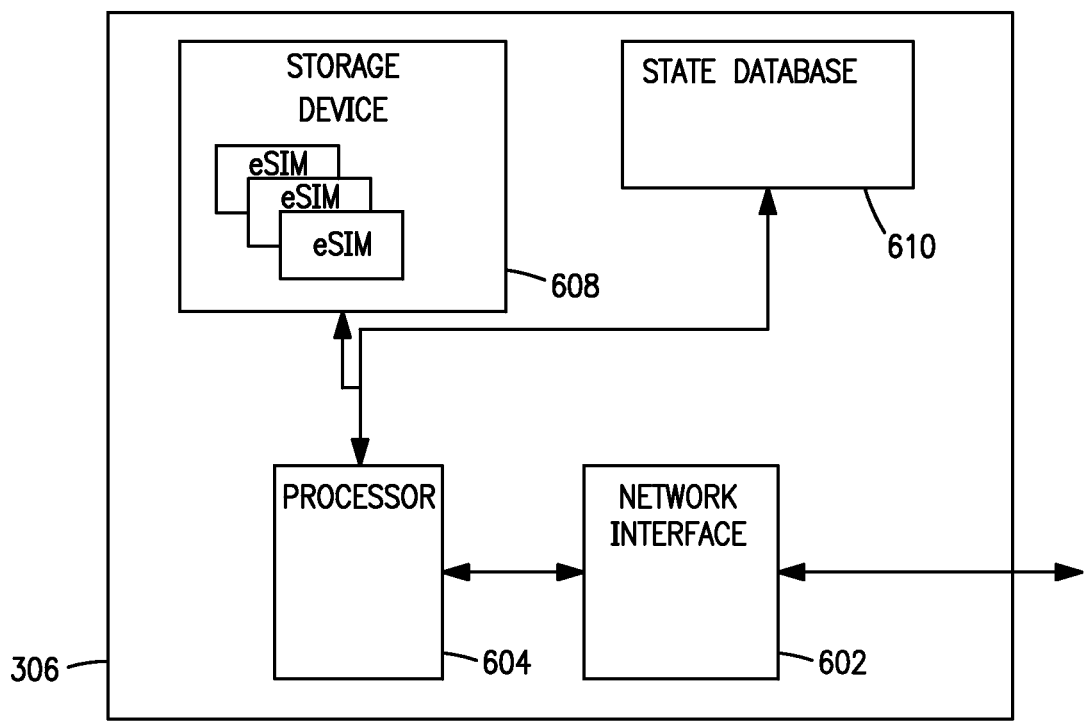
FIG. 6 is a logical block diagram of one exemplary embodiment of an electronic Subscriber Identity Module (eSIM) manager, according to the present invention.

FIG. 6 illustrates one exemplary embodiment of an eSIM manager 306 in accordance with the present invention. The eSIM manager may comprise a stand-alone entity, or be incorporated with other network entities (e.g., a Service Provisioning Service (SPS), etc.). As shown, the eSIM manager 306 generally includes a network interface 602 for interfacing with the communications network, a processor 604, and a storage apparatus 608. The network interface is configured for connection to the network infrastructure 300 of FIG. 3, so as to provide access to other network appliances, and direct or indirect access to one or more mobile devices, although other configurations and functionalities may be substituted.

In the illustrated embodiment of FIG. 6, the eSIM manager 306 includes at least a SIM database 610 running on the processor 604. Although illustrated as a single application running on the eUICC appliance, it is appreciated that the foregoing database functionality may comprise a distributed application running on a plurality of devices in data communication with one another.

The SIM database application is configured to manage one or more eSIMs, including ownership information, unique codes, deployment to users, etc.

eUICC Manager—

In one embodiment the eUICC manager 310 tracks, manages, and updates eUICCs that have been deployed to user devices. For example, an eUICC manager can manage one or more eUICCs, including pushing (or providing on a request basis) updates to eUICC software, etc. During operation, the eUICC manager generates a message, which the eUICC appliance signs and sends to an eUICC. A eUICC that recognizes the signature of the eUICC appliance can be assured that the message/command originated from a trusted source. Various aspects of eUICC manager operation and apparatus are described in greater detail within co-owned U.S. Provisional Patent Application Ser. No. 61/407,862 filed on Oct. 28, 2010 and entitled "METHODS AND APPARATUS FOR DELIVERING ELECTRONIC IDENTIFICATION COMPONENTS OVER A WIRELESS NETWORK" (now U.S. patent application Ser. No. 13/111,801 filed on May 19, 2011, of the same title"), previously incorporated by reference in its entirety, although it will be appreciated that other approaches may be used consistent with the present invention.

In one exemplary embodiment, eUICC managers are the only network entity trusted with the security credentials for modifying the secure eUICC software. Moreover, in some embodiments, due to the sensitive nature of the eUICC software, the eUICC manager may additionally require additional authorization, for example, requiring the owner of the device (which contains the eUICC) to authorize the eUICC manager transactions (e.g. to install a new eSIM, eUICC, eUICC software patch, etc.).

Common examples of updates to the secure software on the eUICC may include, but are not limited to, certificates, software components, and cryptographic keys. In some embodiments, consumer devices may contain equivalent and/or complementary eUICC manager entities to enable self-management (e.g. signing its own messages, updating its own firmware, etc.). Such variants may be limited in capacity, or otherwise enforce consumer-specific rules (certain measures may be protected from modification by the user and/or device e.g., carrier locking information, subsidy enforcement policies, etc.).

Mobile Network Operator (MNO) System, Service Provider—

In one exemplary embodiment, a mobile network operator (MNO) 316 (also interchangeably referred to as a mobile phone operator, carrier service provider, wireless service provider, wireless carrier, cellular network, etc.) is an entity that provides wireless network services to consumer devices, such as cellular phones, cellular enabled equipment (e.g., laptops, tablets, personal computing devices, etc.). MNOs are well known within the related arts, and are not discussed further herein.

More generally, a service provider provides wireless network services to one or more subscriber devices. It is appreciated that service providers may service eSIM enabled devices, legacy devices (devices which operate with a physical SIM card), and various combinations thereof. In one embodiment, the service provider may be the MNO for the devices, or alternately, the service provider may be a third party service which provides roaming or proxy services to the devices in place of the MNO. In still another variant, the service provider finds and manages the wireless network service accounts for one or more user devices, where the wireless network service is wholly provided by an MNO (for example, a service provider can be an intermediary between consumers and one or more MNOs). In these variants, the service provider is the designated entity for managing the service provided to the devices (but does not actually provide the cellular service itself). In some variants, during operation, the service provider is authorized to make changes to the cellular service associated with the devices, and/or associated account changes (such as adding/removing devices, switching service from one MNO to another, etc.).

In some variants, the MNO or service provider may have an additional service provider console configured to provide an interface for bulk account management. Such service provider consoles may additionally transmit change requests to the Account Manager (for example, changes to service, subscription, ownership of accounts, etc.), and/or authorize changes to device eUICCs being serviced by the Service Provider (by transmitting authorization to the eUICC Manager).

Account Manager—

In one embodiment of the present invention, the account manager 314 associates each deployed eSIM to a user account subscription, by interfacing with the MNO billing system and the depot (described subsequently herein), and associating service with the relevant eSIM information (e.g., integrated circuit card identifier (ICCID)). In one such example, the account manager retrieves eSIM information from other modules (e.g. System Directory Service), and attaches that information to a subscription in the MNO billing system.

In various embodiments, the account manager is further configured to authorize eSIMs issued by eSIM managers. Similarly, in some embodiments, the account manager is configured to authorize eUICC updates issued by eUICC managers.

Device eUICC—

Within the context of the present invention, one or more devices includes an eUICC 318. The eUICC is configured to store and execute an eSIM to gain access to the service provider network. In one embodiment, the eUICC is implemented within a secure device (e.g., secure microprocessor) which is separate and secure from the other components of the device. In some variants, the eUICC is further fixably attached to the device (i.e., cannot be removed without damaging or destroying the eUICC). The device eUICC may also include capabilities which are identical, a subset of, or complementary to, the various entities described herein.

For example, in one such embodiment, the device eUICC executes one or more "miniaturized" versions of the eSIM appliance, eSIM manager, secure storage, etc. In another such example, the device eUICC executes only a subset of, or limited version of an eSIM appliance, eSIM manager, secure storage, etc.

Depot—

In one exemplary embodiment, the depot 320 includes one or more subsequently divided software entities. As shown in FIG. 3, the software entities include: one or more of a Communications Manager 326, an Inventory Manager 322, and a System Directory Service 324 (defined subsequently herein), and pending eSIM storage 328. The depot provides a brokering point for exchanging eSIMs within the illustrated network architecture 300, and appropriate directory services. In some embodiments, the depot may additionally subsume various aforementioned entities, including but not limited to: the eSIM manager, the pending eSIM storage, eUICC manager, eUICC appliance, and eSIM appliance, etc.

The various subdivided software entities are described in greater detail hereinafter.

eSIM Inventory Manager—

The eSIM inventory manager 322 submodule distributes eSIM traffic among multiple eSIM managers. The eSIM inventory manager tracks multiple eSIM metadata to ensure consistent depot operation, which may include but is not limited to: location, status, current capacity, projected demand, historical demand, and/or actual demand. Embodiments of the present invention may also predict and anticipate various networking issues, and may perform countermeasures to "load balance" eSIM storage, request additional eSIMs, allocate or reserve eSIMs in response to eSIM allocation requests, etc. Similarly, in some embodiments, the eSIM inventory manager may also move eSIMs from one eSIM appliance to another for even distribution, or based on demand. For example, an eSIM appliance in a data center in one geographic area may receive a greater proportion of "cold" (i.e., never assigned) eSIMs based on various considerations (such as MNO market share, activation rate, etc.).

System Directory Service—

The system directory service submodule 324 is a central repository of metadata addressing pertinent network entities. For example, in one exemplary embodiment, the system directory service provides a query database for eSIMs currently within the domain of the depot storage. A network entity can query the database for the location of a specific eSIM; responsively, the system directory service returns the networked entity (eSIM appliance, secure eSIM storage, etc.) that is currently storing the queried eSIM (if any). In another example, an account manager can request information regarding available cold eSIMs; the system directory service identifies the eSIMs which are available and cold.

In addition to standard database queries, the system directory service may additionally provide services for "forwarding" requests. Request forwarding may be of particular use in distributed networks, where eSIM information is not available to all directory services. Accordingly, in such systems, requests for information can be forwarded to other directory service entities, until either the request has expired, is no longer necessary, has failed (e.g., all entities have returned an insufficient response), or is successful. This forwarding could be based for example on MNO or device types. So all requests for a specific MNO would be forwarded to one directory service (or directory services as it may have primary/secondary arrangements, etc.). The directory service could also have a read-only cache of other directory services down to the specific eSIM level. So if one is looking for eSIMs stored for a specific device or user, a local read-only cache knows, for that specific user or device, where it should forward.

Communications Manager—

The communications manager submodule 326 facilitates communication to and from the depot, and internally within the depot as needed. The communications manager provides a network-side endpoint for all communications with eUICCs, eUICC devices, and other depots (and associated modules). In one exemplary embodiment, the communications module exposes a network address; packets can be addressed to the network address, inspected by the communications manager, and forwarded on to the appropriate entity within (or in communication with) the depot.

Pending eSIM Storage—

The pending eSIM storage submodule 328 can store (temporarily, or for substantially longer periods) eSIMs that are encrypted for delivery to a device eUICC awaiting transfer. Pending eSIM storage is described in greater detail within co-owned U.S. Provisional Patent Application Ser. No. 61/472,115 filed on Apr. 5, 2011, and entitled "APPARATUS AND METHODS FOR DISTRIBUTING AND STORING ELECTRONIC ACCESS CLIENTS" (now U.S. patent application Ser. No. 13/095,716 filed on Apr. 27, 2011, of the same title"), previously incorporated by reference in its entirety, although it will be appreciated that other approaches may be used consistent with the present invention.

Exemplary Use Cases—

As a brief aside, there are several possible states of eSIM operation and allocation. For example, as used herein, the term "pre-personalized eSIM" refers without limitation to an eSIM that is assigned to a specific eUICC (including, in some cases, encrypted for the specific eUICC), prior to the device of the specific eUICC having requested the eSIM. Pre-personalized eSIMs may find particular use in distribution schemes where the relationship between the eSIM and the eUICC is established a priori, such as that described in greater detail within co-owned U.S. patent application Ser. No 12/952,082 filed on Nov. 22, 2010 and entitled "WIRELESS NETWORK AUTHENTICATION APPARATUS AND METHODS", Ser. No. 12/952,089 filed on Nov. 22, 2010 and entitled "APPARATUS AND METHODS FOR PROVISIONING SUBSCRIBER IDENTITY DATA IN A WIRELESS NETWORK", Ser. No. 12/980,232 filed on Dec. 28, 2010 and entitled "VIRTUAL SUBSCRIBER IDENTITY MODULE DISTRIBUTION SYSTEM", and Ser. No. 12/353,227 filed on Jan. 13, 2009, and entitled "POSTPONED CARRIER CONFIGURATION", each of the foregoing previously incorporated by reference in its entirety, although it will be appreciated that other approaches may be used consistent with the present invention.

In contrast, the term "pre-reserved eSIM" refers without limitation to an eSIM that has been set aside and reserved for future assignment by an account manager, but where the destination eUICC has not been identified.

Furthermore, as used hereinafter, a "faux SIM Card" refers without limitation to a simulacrum or likeness of a physical SIM card, for use in conjunction with an eUICC and eSIM, such as that described in U.S. Provisional Patent Application Ser. No. 61/410,298 filed on Nov. 4, 2010 and entitled "SIMULACRUM OF PHYSICAL SECURITY DEVICE AND METHODS" (now U.S. patent application Ser. No. 13/080,533 filed on Apr. 5, 2011, of the same title), previously incorporated by reference in its entirety. For example, in one such implementation, a "faux SIM card" is printed with an activation code, scan pattern, or other activation or access information. In some cases, the printed indicia is further obscured with a "scratch" off veneer. The subscriber purchases the faux card, and enters the activation code into a device; the entered activation code enables the device to log onto a network, and download the appropriate eSIM data.

Within the context of the network architecture illustrated within FIG. 3, various exemplary use case scenarios are now described in greater detail.

Use Case Scenario—Bulk Transfers—

In a first embodiment, a remote console is disclosed for bulk transfers of eSIMs within Machine to Machine (M2M) operation. For example, in one scenario, a first service provider manages a pool of devices. Each device of the pool contains an eUICC. Initially, the service provider requests one or more eSIMs for each eUICC within its pool of devices. The requested subscriptions for the first service provider represent cellular data services for the pool of devices. Common examples of bulk orders may include so-called "fleet" orders (e.g., to outfit a fleet of M2M client devices).

Consider for example, a contractor that is managing a fleet of parking meters for a city. The parking meters use cellular data service for billing and data reporting. The contractor re-evaluates cellular data service contracts for the parking meters on a yearly basis. In this example, the contractor is a service provider and is authorized to modify eSIM/eUICC features for each of the parking meters. Accordingly, the contractor uses the aforementioned service provider console to request a change of service for each meter, from a first MNO to a second MNO.

The contractor uses the service provider console application to contact the first MNO to cancel the current cellular data service contracts, and also contact the second MNO to initialize new cellular data service contracts. The contractor also provides the unique identifiers for each parking meter (e.g. International Mobile Equipment Identity (IMEI), eUICC Card Serial Number (CSN), etc.) that is to be canceled at the first MNO, and created at the second MNO. Thereafter, each eSIM will be allocated, encrypted, and delivered to the parking meters, assuming that the service contracts with the second MNO are accepted. In one exemplary embodiment, the eSIMs are delivered to the parking meters without requiring further interaction with the contractor.

In a second embodiment, the service provider responsible for managing the devices contacts the MNO directly, instead of using the service provider console. For example, a contractor must directly contact a first MNO to cancel subscriptions, and contact a second MNO to add and/or initialize new subscriptions.

In another embodiment, bulk eSIM inventory transfers may be useful for moving large batches of eSIMs from one eSIM manager to another eSIM manager. This may be of particular use when transferring large lots of cold eSIMs from a MNO or SIM manufacturer to a reseller.

Use Case Scenario—Account Creation—

As previously described, a pre-personalized eSIM generally refers to an eSIM which has been assigned to a device eUICC, before the destination eUICC has actually requested the eSIM. Pre-personalized eSIMs can be stored in the pending eSIM storage of a depot, waiting for the destination device eUICC to contact the depot. Once the destination device eUICC requests the pre-personalized eSIM, the waiting pre-personalized eSIM is delivered to the device eUICC. In some cases, the eSIM may not be connected to a user account at the MNO yet; accordingly, in some embodiments, additional account and/or eSIM metadata is provided to the MNO to enable service.

For example, consider a customer that purchases a device from a store associated with a MNO, or requests activation of a device for use with the MNO. At the store (or later at home), the customer establishes an account for service with the MNO. The MNO generates a subscription for cellular service for the customer's purchased device. Thereafter, the MNO account manager contacts a depot inventory manager to find an available eSIM. In some cases, the MNO account manager can contact several depots before finding a suitable eSIM. Once a suitable eSIM has been found, the eSIM is reserved for the subscription account, and the eSIM metadata (ICCID, etc.) is sent to the MNO account manager for association with the customer's subscription account. The MNO account manager completes the account setup (checking credit, etc.) and confirms to the depot eSIM manager that the eSIM is ready to be issued. In one embodiment, the confirmation includes one or more of: a device eUICC CSN, a device serial number, a device unique identifier, etc. The depot pairs the eSIM to the eUICC of the destination device. The depot then encrypts (via the eSIM Appliance) the eSIM and delivers it to the device.

It is also possible that an eSIM could have been pre-reserved or pre-personalized for the device (by matching the eUICC CSN with an eSIM for the MNO, if the CSN can be mapped to a specific MNO by the Depot provider, such as the MNO or an OEM).

In another such example, a customer purchases a device which has been pre-assigned to an eSIM from a MNO store. The pre-assigned eSIM is matched to the device's eUICC CSN. Once the eSIM has been pre-personalized for the device, it can be readily delivered to the device even during high-demand situations. The eSIM is waiting in the depot to be retrieved, and can be issued as soon as the device issues a request for its eSIM.

In yet a third example, a customer purchases a device in a so-called "direct fulfillment" scheme. In this case, the device is purchased by the customer online (or other mail-order scenario), and the device eUICC and the eSIM are paired, and the device is shipped to the customer (i.e., the pairing occurs before the customer has possession of the device). When the user receives the device and switches the device on, the device downloads the appropriately paired eSIM from the appropriate depot. Variations of this scheme may be implemented with pre-reserved eSIMs, and/or pre-personalized eSIMs. Faux card implementations enable eSIM support for migration from legacy systems (changes are not necessary to existing Point of Sales (POSs), SIM distribution processes and MNO billing systems).

In a fourth example, a customer purchases a faux SIM card which has an activation code and/or unique identifier printed thereon, where the faux card represents an eSIM. For instance, in one embodiment, the eSIM ICCID and activation code is printed onto the faux card and obscured with a scratch-off veneer. When the customer account is set up, the MNO representative picks a faux SIM card from the faux SIM card inventory at the MNO and enters the ICCID from that card into the MNO system, to attach that ICCID to the customer's account. Alternately, the user can enter the faux card eSIM ICCID and activation code into the device, causing the device to contact the appropriate depot and request the eSIM associated with the specific ICCID to be prepared for the eUICC. Once the eSIM has been prepared, the eSIM can be delivered to the device.

Use Case Scenario—Account Termination—

In one example of account termination, a customer contacts their current MNO to cancel their service/account with that MNO. Responsively, the MNO disables the eSIM by: disabling eSIM network access credentials, disassociating the ICCID from the subscriber's account, and/or changing to the account to an inactive or disabled status, etc. In some embodiments, the MNO may also request that the device eUICC deletes the eSIM.

In another example of account termination, a user can manually delete an eSIM from the eUICC in their device by using a menu option on the device (in some cases, this may require administrative privileges, etc.). In one such variant, the user will also be requested to confirm their physical presence using a mechanism that cannot be forged with software (e.g., a physical button press which cannot be activated with software). Such physical presence verification can prevent malicious deletion of eSIMs by a rogue program, etc. It is of particular note that mere removal of an eSIM is not sufficient to cancel the customer's account, and the MNO must still cancel the customer's subscription account; however this can be done without requiring further communication between the device eUICC and the MNO.

Use Case Scenario—Miscellaneous Transactions—

Various other scenarios may be implemented in view of the foregoing network of FIG. 3. Examples of such transactions are described in greater detail within co-owned U.S. Provisional Patent Application Ser. Nos. 61/472,109 filed Apr. 5, 2011 and entitled "APPARATUS AND METHODS FOR STORING ELECTRONIC ACCESS CLIENTS" (now U.S. patent application Ser. No. 13/093,722 filed on Apr. 25, 2011, of the same title"), 61/472,115 filed on Apr. 5, 2011, and entitled "APPARATUS AND METHODS FOR DISTRIBUTING AND STORING ELECTRONIC ACCESS CLIENTS" (now U.S. patent application Ser. No. 13/095,716 filed on Apr. 27, 2011, of the same title"), previously incorporated by reference in their entireties.

For example, in some use scenarios, a user may move an eSIM from a first device eUICC to a device second eUICC. In some embodiments, the customer may change between several devices. In one such case, the eSIM is transferred between device eUICCs, rather than updating the MNO with new billing information, device information, etc. This is analogous to moving a physical SIM card from one device to another device.

Similarly, in some use scenarios, a user may move an eSIM from a device eUICC to the eSIM manager for "parking". A "parked" eSIM is inactive, and can in some instances, be recalled for later use, etc. In one such example, the eSIM is removed from the donating device eUICC (i.e., no resident copy); the eSIM is associated with a user or enterprise account and stored for future retrieval from the eSIM manager. For instance, a customer sends their phone in for service via the mail and can park their eSIM at a depot until a replacement phone is sent back or the repaired unit is returned.

In one such variant, the eSIM can be parked at an eSIM manager for a destination eUICC. In one scenario, an eSIM can be removed from a donating device eUICC and stored in the eSIM manager for delivery to a destination eUICC. This may commonly occur where a customer wants to move an eSIM from one phone to another but the destination device is not currently available (e.g., not powered on, inactive, etc.).

In yet another variant, a eSIMs can be moved based on a consideration or criterion, such as time or geography. For example, an eSIM can be transferred from an eSIM manager or other eUICC device (donating eUICC) to a recipient eUICC for a specified period of time. After the expiration, the eSIM is returned to the donating eUICC. Examples of such uses include: where a device manufacturer loads a test eSIM for testing device functionality, where a customer service representative loads a test eSIM to verify device functionality, etc.

In another such example, an eSIM can be transferred from an eSIM manager or other eUICC device (donating eUICC) to a recipient eUICC based on a particular geographic cue. This may be useful in certain roaming, and or dual-use situations (e.g., work and home). In still another variant, various deployments of eSIMs may be required to implement software changes "in the field". Such devices will download and replace the eSIM software, components of the eUICC. In these scenarios, the eUICC Manager initiates the download of a one or more eSIM patches from the eSIM manager to a destination eUICC. The eUICC Manager may also require deletion of previously stored eSIMs and or eUICC functionality. Still other variations of this are described in greater detail within U.S. Provisional Patent Application No. 61/407,862 filed on Oct. 28, 2010 and entitled "METHODS AND APPARATUS FOR DELIVERING ELECTRONIC IDENTIFICATION COMPONENTS OVER A WIRELESS NETWORK" (now U.S. patent application Ser. No. 13/111,801 filed on May 19, 2011, of the same title"), previously incorporated by reference in its entirety.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An apparatus for distributing electronic Subscriber Identity Modules (eSIMs), comprising:
    one or more eSIM appliances configured to encrypt a plurality of eSIMs, wherein the one or more eSIM appliances comprises hardware, software or a combination of hardware and software;
    one or more secure eSIM storage components configured to store the plurality of eSIMs and associated eSIM metadata, wherein the one or more secure eSIM storage components is communicably coupled to the one or more eSIM appliances, and the one or more secure eSIM storage components comprises hardware or a combination of hardware and software;
    one or more eSIM management entities configured to perform at least one of tracking, verification, and authorization for the plurality of eSIMs, wherein the one or more eSIM management entities comprises hardware, software or a combination of hardware and software; and
    one or more secure element appliances configured to protect one or more cryptographic materials associated with the plurality of eSIMs that are transmitted to one or more device secure elements, wherein the one or more secure element appliances comprises hardware, software or a combination of hardware and software,
    wherein the one or more eSIM appliances is further configured to:
    receive a request for at least one eSIM from among the plurality of eSIMs, and
    retrieve current state information associated with the at least one eSIM, wherein the current state information is used to determine whether to provide the at least one eSIM in response to the request.

2. The apparatus of claim 1, wherein the one or more secure element appliances comprises an electronic Universal Integrated Circuit Card (eUICC) appliance, and the one or more device secure elements comprises a device eUICC.

3. The apparatus of claim 2, wherein the eUICC appliance comprises at least one networked server operated by a trusted entity, and the device eUICC is associated with a mobile device.

4. The apparatus of claim 3, wherein the device eUICC comprises a physically secure card-like form factor receivable within the mobile device.

5. The apparatus of claim 1, wherein the one or more cryptographic materials are transmitted to the one or more device secure elements via a wireless link between the one or more secure element appliances and the one or more device secure elements.

6. A system for distributing electronic Subscriber Identity Modules (eSIMs), comprising:
    one or more eSIM appliances configured to encrypt a plurality of eSIMs, wherein the one or more eSIM appliances comprises hardware, software or a combination of hardware and software;
    one or more secure eSIM storage components configured to store the plurality of eSIMs and associated first eSIM metadata, wherein the one or more secure eSIM storage components is coupled to the one or more eSIM appliances, and the one or more secure eSIM storage components comprises hardware or a combination of hardware and software;
    one or more eSIM managers, wherein each of the one or more eSIM managers is configured to track, verify, and authorize the plurality of eSIMs, and the one or more eSIM managers comprises hardware, software or a combination of hardware and software;
    one or more electronic Universal Integrated Circuit Card (eUICC) appliances, wherein each of the one or more eUICC appliances is configured to protect one or more cryptographic materials associated with the plurality of eSIMs that are transmitted to one or more device eUICCs, and the one or more eUICC appliances comprises hardware, software or a combination of hardware and software;
    one or more eUICC managers, wherein each of the one or more eUICC managers is configured to track, verify, and authorize the one or more device eUICCs, and the one or more eUICC managers comprises hardware, software or a combination of hardware and software; and
    one or more depots, wherein each depot of the one or more depots is configured to store a portion of the plurality of eSIMs and associated second eSIM metadata, and each depot of the one or more depots comprises:
    an eSIM inventory manager configured to distribute the portion of the plurality of eSIMs among the one or more eSIM managers, and track the second eSIM metadata to facilitate inventory management of the portion of the plurality of eSIMs, wherein the eSIM inventory manager comprises hardware, software or a combination of hardware and software;

a system directory service configured to service one or more requests for information associated with the portion of the plurality of eSIMs, wherein the system directory service comprises hardware, software or a combination of hardware and software; and a pending eSIM storage configured to store the portion of the plurality of eSIMs for delivery to the one or more device eUICCs, wherein the pending eSIM storage comprises hardware, software or a combination of hardware and software.

7. The system of claim 6, wherein the eSIM inventory manager is configured to distribute the portion of the plurality of eSIMs based on a projected demand, a historical demand or an actual demand.

8. The system of claim 6, wherein the second eSIM metadata is periodically checked to identify a stale copy of a particular eSIM from among the portion of the plurality of eSIMs.

9. The system of claim 8, wherein the second eSIM metadata is periodically checked by the one or more eUICC appliances.

10. The system of claim 6, wherein the portion of the plurality of eSIMs comprises a pre-personalized eSIM that is assigned a particular device eUICC of the one or more device eUICCs, and the pre-personalized eSIM is delivered to the particular device eUICC in response to a request from the particular device eUICC.

11. The system of claim 6, wherein each depot of the one or more depots stores a copy of a particular eSIM from among the portion of the plurality of eSIMs, and in response to a delivery of a first copy of the particular eSIM to the one or more device UICCs from a first depot of the one or more depots, one or more remaining copies of the particular eSIM at other depots of the one or more depots is deleted or rendered inactive.

12. The system of claim 6, wherein the one or more requests for information comprises a request for a location of a particular eSIM from among the portion of the plurality of eSIMs.

13. The system of claim 6, wherein the one or more requests for information comprises a request for information regarding a type of particular eSIM from among the portion of the plurality of eSIMs.

14. The system of claim 6, wherein the second eSIM metadata is encrypted with a key associated with the one or more depots.

15. A method for transmitting one or more cryptographic materials to a destination device from a source device according to a trusted relationship, the method comprising:

encrypting, by a processor at the source device, an electronic Subscriber Identity Module (eSIM) based on at least a unique device key and an endorsement certificate, wherein the unique device key is unique to the destination device, the endorsement certificate uniquely identifies the source device as a trusted device, and the eSIM comprises the one or more cryptographic materials;

in response to a request for the eSIM from the destination device, retrieving, by the processor at the source device, current state information associated with the eSIM, wherein the current state information is used to determine whether to provide the eSIM to the destination device;

communicating, by the processor at the source device, the eSIM to the destination device, wherein the endorsement certificate of the source device is verified at the destination device and the eSIM is decrypted at the destination device; and deleting, by the processor at the source device, the eSIM that is communicated to the destination device, wherein the trusted relationship between the source device and the destination device ensures that the one or more cryptographic materials cannot be modified by untrusted entities.

16. A method for ensuring secure delivery of one or more cryptographic materials to a destination device according to a standard trusted relationship, comprising:

encrypting, by a processor, an electronic Subscriber Identity Module (eSIM) based on a unique device key and an endorsement certificate, wherein the unique device key is unique to the destination device, and the eSIM comprises the one or more cryptographic materials;

causing, by the processor, delivery of the eSIM to the destination device, wherein the destination device is associated with a subscriber, the eSIM is decrypted at the destination device, the delivery is accomplished via one or more depots, each depot of the one or more depots is configured to store a copy of the eSIM for delivery to the destination device, and when a first copy of the eSIM is delivered to the destination device from a first depot of the one or more depots, one or more remaining copies of the eSIM at other depots of the one or more depots is deleted or rendered inactive; and receiving, by the processor, a registration communication associated with the first copy of the eSIM from the destination device after the eSIM is decrypted, wherein when a subsequent registration communication associated with the one or more remaining copies of the eSIM is attempted, further utilization of the one or more cryptographic materials associated with the eSIM is precluded for any device other than the destination device.

17. The method of claim 16, wherein the destination device comprises a mobile device, and the registration communication is communicated via a wireless interface of the mobile device.

18. A non-transitory computer readable storage medium configured to store instructions that, when executed by a processor included in a computing device, cause the computing device to carry out steps that include:

encrypting an electronic Subscriber Identity Module (eSIM) based on at least a unique device key and an endorsement certificate, wherein the unique device key is unique to a destination device, the endorsement certificate uniquely identifies a source device as a trusted device, and the eSIM comprises one or more cryptographic materials;

in response to a request for the eSIM from the destination device, retrieving current state information associated with the eSIM, wherein the current state information is used to determine whether to provide the eSIM to the destination device;

communicating the eSIM to the destination device, wherein the endorsement certificate of the source device is verified at the destination device and the eSIM is decrypted at the destination device; and deleting the eSIM that is communicated to the destination device, wherein a trusted relationship between the source device and the destination device ensures that the one or more cryptographic materials cannot be modified by untrusted entities.

* * * * *